(12) United States Patent
Lee et al.

(10) Patent No.: US 11,515,911 B2
(45) Date of Patent: Nov. 29, 2022

(54) METHOD AND APPARATUS FOR MU-MIMO TRANSMISSION

(71) Applicant: INDUSTRY-ACADEMIC COOPERATION FOUNDATION, DANKOOK UNIVERSITY, Yongin-Si (KR)

(72) Inventors: Kyu Haeng Lee, Seoul (KR); Su Han Choi, Gwacheon-Si (KR)

(73) Assignee: Industry-Academic Cooperation Foundation, Dankook L, Yongin-Si (KR)

( * ) Notice: Subject to any disclaimer, the term of this patent is extended or adjusted under 35 U.S.C. 154(b) by 69 days.

(21) Appl. No.: 17/126,526

(22) Filed: Dec. 18, 2020

(65) Prior Publication Data
US 2022/0190889 A1 Jun. 16, 2022

(30) Foreign Application Priority Data
Dec. 11, 2020 (KR) .................. 10-2020-0173107

(51) Int. Cl.
*H04W 72/04* (2009.01)
*H04B 7/0452* (2017.01)
*H04B 7/06* (2006.01)
*H04L 5/00* (2006.01)

(52) U.S. Cl.
CPC ......... *H04B 7/0452* (2013.01); *H04B 7/0626* (2013.01); *H04W 72/042* (2013.01); *H04W 72/0446* (2013.01); *H04L 5/0007* (2013.01)

(58) Field of Classification Search
CPC . H04B 7/0452; H04B 7/0626; H04W 72/042; H04W 72/0446; H04W 72/0406; H04W 56/00; H04W 84/12; H04L 5/0007
See application file for complete search history.

(56) References Cited

U.S. PATENT DOCUMENTS

| 2015/0319747 | A1* | 11/2015 | Chu ...................... H04L 5/0023 370/330 |
| 2017/0289933 | A1* | 10/2017 | Segev ................. H04W 72/048 |
| 2021/0329647 | A1* | 10/2021 | Park ...................... H04L 1/0072 |

OTHER PUBLICATIONS

Using OFDMA for MU-MIMO User Selection in 802.11ax-Based Wi-Fi Networks; accepted Dec. 16, 2019, date of publication Dec. 18, 2019, date of current version Dec. 31, 2019. Digital Object Identifier 10.1109/ACCESS.2019.2960555.

* cited by examiner

*Primary Examiner* — Wei Zhao
(74) *Attorney, Agent, or Firm* — Invenstone Patent, LLC

(57) ABSTRACT

A method for Multi-User Multi-Input Multi-Output (MU-MIMO) transmission is provided. The method comprises: receiving an uplink Orthogonal Frequency Division Multiple Access (OFDMA) frame from a plurality of stations; estimating downlink channel states for the plurality of stations based on the uplink OFDMA frame; and selecting one or more of the plurality of stations for downlink MU-MIMO transmissions based on the estimation of downlink channel states for the plurality of stations.

20 Claims, 24 Drawing Sheets

FIG. 4

| 26 (0) | 26 (1) | 26 (2) | 26 (3) | 26 (4) | 26 (5) | 26 (6) | 26 (7) | 26 (8) |
|---|---|---|---|---|---|---|---|---|
| 52 (9) | | 52 (10) | | 26 (11) | 52 (12) | | 52 (13) | |
| 106 (14) | | | | 26 (15) | 106 (16) | | | |
| 242 (17) | | | | | | | | |

FIG. 13

Algorithm 1 MUSE Resource Allocation Algorithm

1  $u^{best} = 0;$ // maximum sum-utility
2  $g^{opt} = 0;$ // optimal $g$ value
3  $b^{opt} = 20;$ // channel bandwidth for DL MU-MIMO
4  $\mathbf{X}^{opt} = \mathbf{Y}^{opt} = \vec{0};$ // all elements of each are zero at the beginning
5  for $g \in \{0, 1, 2, ..., g^{max}\}$ do
6      for $b \in \{20, ..., B^{max}\}$ do
7          $(u, \mathbf{X}, \mathbf{Y}) \leftarrow$ solve MRAP for $g$ and $b$;
8          if $u \cdot \delta^g > u^{best}$ then
9              $\mathbf{X}^{opt} = \mathbf{X};$
10             $\mathbf{Y}^{opt} = \mathbf{Y};$
11             $u^{best} = u;$
12             $g^{opt} = g;$
13             $b^{opt} = b;$
14         end
15     end
16 end
17 return $g^{opt}, b^{opt}, \mathbf{X}^{opt}, \mathbf{Y}^{opt};$

METHOD AND APPARATUS FOR MU-MIMO TRANSMISSION

CROSS-REFERENCE TO RELATED APPLICATION

This application is based on and claims the benefit of priority to Korean Patent Application No. 10-2020-0173107, filed on Dec. 11, 2020, the disclosure of which is incorporated herein in its entirety by reference.

BACKGROUND OF THE INVENTION

Field of the Invention

The present invention relates to data transmission, and more particularly, to a method and an apparatus for performing MU-MIMO (Multi-User Multi-Input Multi-Output) transmissions.

Related Art

Among the multi-user (MU) communication mechanisms, multi-user multi-input multi-output (MU-MIMO) and orthogonal frequency division multiple access (OFDMA), have recently attracted much attention as technologies to boost the capabilities of 802.11 Wi-Fi systems. The method of MU transmission in Wi-Fi systems still suffers from severe problems with channel state information (CSI) feedback overhead, however, and this precludes obtaining much higher MU-MIMO gains through user selection. Although in 802.11ax-based Wi-Fi systems the methods used for uplink OFDMA transmission and downlink MU-MIMO transmission bear a great deal of resemblance to each other, in the sense that both are initiated by the AP, this similarity in protocol is not appropriately utilized for close collaboration between the two technologies.

SUMMARY OF THE INVENTION

An aspect of the present invention is to provide a method and an apparatus for Multi-User Multi-Input Multi-Output (MU-MIMO) transmission, which may be able to perform a user selection for downlink MU-MIMO by estimating downlink channel states based on an uplink OFDMA frame.

However, the problems to be solved by the present inventive concept are not limited to the above, and it may be variously extended without departing from the spirit and scope of the present inventive concept.

An exemplary embodiment of the present invention provides a method for Multi-User Multi-Input Multi-Output (MU-MIMO) transmission, the method comprising: receiving an uplink Orthogonal Frequency Division Multiple Access (OFDMA) frame from a plurality of stations; estimating downlink channel states for the plurality of stations based on the uplink OFDMA frame; and selecting one or more of the plurality of stations for downlink MU-MIMO transmissions based on the estimation of downlink channel states for the plurality of stations.

In an aspect, said uplink OFDMA frame comprises at least one channel estimation slot, the channel estimation slot being configured to allocate wider channel bandwidth to at least one of a plurality of stations than a channel bandwidth by OFDMA resource allocation.

In an aspect, said at least one channel estimation slot is located at the end of the uplink OFDMA frame.

In an aspect, said uplink OFDMA frame is configured to allocate resources to the plurality of stations based on a performance of both the uplink OFDMA transmission and the downlink MU-MIMO transmission.

In an aspect, said performance of the uplink OFDMA transmission comprises obtaining data transmission time for the uplink OFDMA transmission, and said performance of the downlink MU-MIMO transmission comprises obtaining a downlink MU-MIMO diversity gain.

In an aspect, said allocating resources comprises regulating the number of the channel estimation slot in the OFDMA frame.

In an aspect, the method further comprises performing downlink MU-MIMO transmission for the selected one or more of the plurality of stations, wherein both said receiving the uplink OFDMA frame and said performing downlink MU-MIMO transmission are configured to occur within one transmission opportunity (TxOP).

In an aspect, said receiving the uplink OFDMA frame from the plurality of stations comprises receiving an uplink OFDMA frame from one or more of stations which have no data to be sent.

Another exemplary embodiment of the present invention provides a method for Multi-User Multi-Input Multi-Output (MU-MIMO) transmission, the method comprising: receiving a trigger frame (TF); and in response to receiving the TF, sending uplink Orthogonal Frequency Division Multiple Access (OFDMA) frame, wherein the uplink OFDMA frame is to be used to estimate downlink channel states for a downlink MU-MIMO transmission.

In an aspect, said uplink OFDMA frame comprises at least one channel estimation slot, the channel estimation slot being configured to allocate wider channel bandwidth to at least one of a plurality of stations than a channel bandwidth by OFDMA resource allocation.

Another exemplary embodiment of the present invention provides an apparatus for Multi-User Multi-Input Multi-Output (MU-MIMO) transmission, the apparatus comprising a processor and a transceiver, the processor being configured to: receive an uplink Orthogonal Frequency Division Multiple Access (OFDMA) frame from a plurality of stations; estimate downlink channel states for the plurality of stations based on the uplink OFDMA frame; and select one or more of the plurality of stations for downlink MU-MIMO transmissions based on the estimation of downlink channel states for the plurality of stations.

In an aspect, said uplink OFDMA frame comprises at least one channel estimation slot, the channel estimation slot being configured to allocate wider channel bandwidth to at least one of the plurality of stations than a channel bandwidth by OFDMA resource allocation.

In an aspect, said at least one channel estimation slot is located at the end of the uplink OFDMA frame.

In an aspect, said uplink OFDMA frame is configured to allocate resources to the plurality of stations based on a performance of both the uplink OFDMA transmission and the downlink MU-MIMO transmission.

In an aspect, said performance of the uplink OFDMA transmission comprises obtaining data transmission time for the uplink OFDMA transmission, and said performance of the downlink MU-MIMO transmission comprises obtaining a downlink MU-MIMO diversity gain.

In an aspect, said allocating resources comprises regulating the number of the channel estimation slot in the OFDMA frame.

In an aspect, the processor is further configured to perform downlink MU-MIMO transmission for the selected one or more of the plurality of stations, wherein both said receiving the uplink OFDMA frame and said performing downlink MU-MIMO transmission are configured to occur within one transmission opportunity (TxOP).

In an aspect, said receiving the uplink OFDMA frame from the plurality of stations comprises receiving an uplink OFDMA frame from one or more of stations which have no data to be sent.

Another exemplary embodiment of the present invention provides an apparatus for Multi-User Multi-Input Multi-Output (MU-MIMO) transmission, the apparatus comprising a processor and a transceiver, the processor being configured to: receive a trigger frame (TF); and in response to receiving the TF, send uplink Orthogonal Frequency Division Multiple Access (OFDMA) frame, wherein the uplink OFDMA frame is to be used to estimate downlink channel states for a downlink MU-MIMO transmission.

In an aspect, said uplink OFDMA frame comprises at least one channel estimation slot, the channel estimation slot being configured to allocate wider channel bandwidth to at least one of a plurality of stations than a channel bandwidth by OFDMA resource allocation.

The disclosed technique may have following effects. It should be understood, however, that the scope of the present disclosure is not to be construed as limited thereto, as it is not meant that particular embodiments should include all of the following effects or only include the following effects.

In accordance with the method and apparatus for Multi-User Multi-Input Multi-Output (MU-MIMO) transmission, it may be able to perform a user selection for downlink MU-MIMO by estimating downlink channel states based on an uplink OFDMA frame.

Thus, it may be able to perform an optimal user selection for downlink MU-MIMO without occurring downlink channel state information feedback overhead. And a network throughput may be enhanced even in co-existence with legacy nodes.

BRIEF DESCRIPTION OF THE DRAWINGS

FIG. 4 shows RU locations in a 20 MHz channel.

FIG. 13 shows MUSE Resource Allocation Algorithm.

DETAILED DESCRIPTION OF THE INVENTION

Figure 1A:
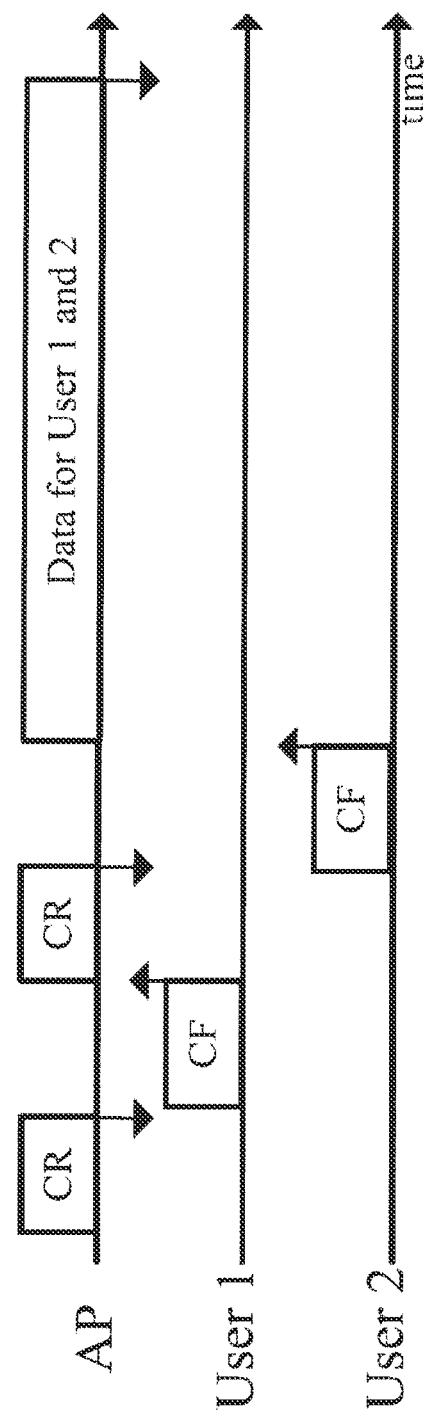
FIGS. 1A and 1B show the two multi-user transmission protocols in 802.11ax.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Overview

Two innovative multi-user (MU) communication mechanisms, multi-user multi-input multi-output (MU-MIMO) and orthogonal frequency division multiple access (OFDMA), have recently attracted much attention as key technologies to boost the capabilities of 802.11 Wi-Fi systems. The method of MU transmission in Wi-Fi systems still suffers from severe problems with channel state information (CSI) feedback overhead, however, and this precludes obtaining much higher MU-MIMO gains through user selection. Although in 802.11ax-based Wi-Fi systems the methods used for uplink OFDMA transmission and downlink MU-MIMO transmission bear a great deal of resemblance to each other, in the sense that both are initiated by the AP, this similarity in protocol is not appropriately utilized for close collaboration between the two technologies. This specification proposes MUSE, a novel multi-user transmission scheme for 802.11ax networks. By exploiting uplink OFDMA transmissions for MU-MIMO user selection, MUSE takes advantage of both OFDMA and MU-MIMO functionalities. In particular, the AP estimates and gathers multiple CSI values from the uplink OFDMA frame, and this channel information is then used to find the optimal downlink MU-MIMO receiver group to maximize the system utility. To realize MUSE, a new OFDMA resource allocation algorithm and frame structure are developed. Extensive MATLAB simulation results show that MUSE significantly improves the network throughput, even in dense network scenarios, and also works effectively in co-existence with legacy nodes.

Owing to fast data rates, easy installation and free Internet access, the number of Wi-Fi users and devices has been continuously increasing over the last few years. The results of research in industry show that there will be around 500 million Wi-Fi hotspots by 2021, and more than 50% of all Internet traffic will be carried by Wi-Fi. Uplink enhancement in Wi-Fi is also getting more attention due to the development of diverse applications such as peer-to-peer computing, streaming services, IoT systems and cloud applications. Given this trend, it is easy to imagine that future Wi-Fi networks will become more dense than at present, and will suffer from severe congestion problems; this means that frame collisions may frequently occur, users will have to wait for a very long time to receive and transmit data, and the quality of the user experience will drop significantly.

Multi-user (MU) transmission has been attracting great attention as a key technology to tackle these problems in Wi-Fi systems. By enabling multiple wireless nodes to communicate with each other concurrently, it not only increases the system throughput but also effectively lowers the degree of network congestion. To realize MU communication in Wi-Fi, two major communication schemes have been employed: MU multi-input multi-output (MU-MIMO) and orthogonal frequency division multiple access (OFDMA). IEEE 802.11ac is the first Wi-Fi standard to adopt the MU-MIMO functionality, facilitating the concurrent transmission of different data streams to multiple user stations (hereinafter, it may be referred to as 'users' or 'stations'), but this is only available on the downlink and not on the uplink. The emerging IEEE 802.11axWi-Fi standard attempts to overcome this limitation by using OFDMA, which allocates non-overlapping subchannels to multiple users so that they can simultaneously transmit to the uplink. In this way, OFDMA significantly reduces contention and preamble overhead, and these savings can be especially effective in dense network environments.

Although MU-MIMO and OFDMA have tremendous potential to improve Wi-Fi performance, several challenging problems limit the gains made in using these approaches. Firstly, to take advantage of the high transmission rate of MU-MIMO, an AP needs to obtain the channel state information (CSI) of users; however, the use of a series of poll-based CSI feedback for each user (see FIG. 1A) as suggested in the current Wi-Fi standards causes considerable MAC overhead. According to research, the CSI feedback overhead can reach up to 25× the data transmission time in the case of 160 MHz bandwidth and 4×1 MIMO, which could easily overwhelm the MU-MIMO diversity gain.

Secondly, although the performance of MU-MIMO and OFDMA may vary significantly depending on the users involved in the MU transmission, the current MU transmission protocols make it impractical to construct an appropriate user group or to apply certain proposed user selection schemes. In particular, in the case of MU-MIMO, the throughput of an MU transmission could be significantly reduced, and may be even lower than the throughput of a single user transmission, if the AP transmits to users whose channels are not sufficiently orthogonal to each other. To prevent this case and obtain a higher MU-MIMO gain, the AP needs to acquire CSI from as many as users as possible; unfortunately, it is nontrivial to do this with the current CSI feedback protocol shown in FIG. 1A. Several ingenious user selection schemes handle this issue by ensuring that the user selection is finished during the CSI feedback procedure and thus the CSI feedback overhead is reduced. However, the gain of these schemes may remain marginal in practice, particularly in the case where severe channel contention from many users makes it difficult for the AP to obtain channel access.

Lastly, as MU communication techniques employed in Wi-Fi have become more diverse, the MAC protocol has also become complicated and fragmented. In particular, although in 802.11ax-based Wi-Fi systems the methods of uplink and downlink MU transmission bear some resemblance to each other, in the sense that MU transmissions are initiated by the AP as shown in FIG. 1, the current scheme does not utilize this similarity in the protocols to give close cooperation between the two methods. If this similarity is appropriately exploited, the protocol for MU transmissions can be made more concise and thus more efficient, especially in dense network environments. In particular, it is very useful to handle the issue of MU-MIMO user selection; the more transmission opportunities the AP obtains, the higher the MU-MIMO user selection gains it achieves.

To address the aforementioned issues, this specification proposes a novel MU transmission scheme for 802.11ax networks, called MU-MIMO User SElection (MUSE). The method for MU-MIMO transmission according to an embodiment of the present invention may comprise MUSE. Motivated by the fact that in 802.11ax, the AP can control both MU-MIMO and OFDMA transmissions in a very similar way, MUSE operates the MU transmissions of MU-MIMO and OFDMA in a consolidated manner, thus eliminating protocol redundancy. More specifically, when the AP accesses the channel, it processes an uplink OFDMA transmission and then a downlink MU-MIMO transmission, one at a time. In addition, the MUSE AP could estimate and gather multiple downlink CSI from users from the uplink OFDMA frame, and utilize this information to compute the optimal MU-MIMO receiver group and the beamforming weights.

In order to implement MUSE, several technical challenges need to be resolved. Firstly, an efficient method of estimating the downlink CSI of users from uplink OFDMA transmissions is required. Since the CSI estimated from the OFDMA transmission only refers to the uplink channel, we cannot directly apply it to downlink MU-MIMO. Furthermore, if users are allocated only certain parts of the channel via OFDMA resource allocation, then the estimated CSI for these users may be inadequate for MU-MIMO beamforming, which generally requires channel states with a sufficient channel bandwidth (e.g., at least 20 MHz). In view of these issues, a new OFDMA frame structure is designed such that during these slots (called the MUSE CSI estimation section, MCS), selected users can use the channel bandwidth required for MU-MIMO, thereby making it possible for the AP to obtain CSI for these. In addition, the channel reciprocity applied here could extract the downlink channel coefficients from the measured uplink channel coefficients. Hereinafter, MCS could be referred as 'channel estimation slot'.

Secondly, unlike in conventional OFDMA scheduling, MUSE resource allocation needs to consider the performance of the downlink MU-MIMO as well as that of the uplink OFDMA transmission. The size of the MCS also needs to be taken into account, since this has a huge impact on MUSE performance; as more resources are allocated to the MCS, the MU-MIMO diversity gain increases, while the time for actual data transmission is reduced. Taking all these considerations into account, the resource allocation problem could be formulated as a utility maximization problem, and an algorithm is also described to solve the problem. The proposed scheme effectively finds the optimal size of the MCS, and allocates OFDMA resources appropriately to users in order to achieve the system goal. In particular, heterogeneity in the maximum bandwidths of users is considered in the resource allocation.

Lastly, MUSE should work well even in the presence of legacy nodes. To ensure that the legacy nodes in MUSE can access the channel and obtain transmission opportunities as before, the same maximum transmission time (i.e., transmission opportunity (TxOP)) is applied, and no schemes could be employed to give higher transmission priorities to the MUSE-capable nodes. Nevertheless, it is observed that OFMDA-capable users of both 802.11ax and MUSE may suffer from severe starvation, particularly in crowded network environments, since the AP has difficulty accessing the channel and thus the users also cannot obtain sufficient transmission opportunities. On this issue, this specification shows that the existing enhanced distributed coordination access (EDCA) of Wi-Fi could be an effective solution; if the AP is given an appropriately high transmission priority, then the throughput of both legacy users and OFDMA users can be improved.

To evaluate performance of MUSE, MUSE and several other recent schemes were implemented in MATLAB simulator. Through extensive MATLAB simulations, it is observed that MUSE obtains system throughput that is 3:9×, 3:7× and 1:4× higher than 802.11ac, OPUS (a MU-MIMO user selection scheme), and 802.11ax, respectively. It is also verified that MUSE operates properly in co-existence with legacy nodes; legacy nodes do not experience any throughput degradation, and their throughput in fact increases thanks to the high MAC efficiency of MUSE.

The contributions of this invention are as follows:
We propose the use of OFDMA for MU-MIMO user selection in 802.11ax-based Wi-Fi networks. The concept of integrated uplink/downlink MU transmission is developed, and a new OFDMA frame structure with MCS is designed to realize the proposed idea.

OFDMA resource allocation is formulated as a utility maximization problem in terms of the performance of both the uplink OFDMA and the downlink MU-MIMO. The heterogeneous maximum bandwidths of users are considered in the allocation, and an algorithm is proposed to find the optimal MCS length and an appropriate channel bandwidth for MU-MIMO.

Extensive performance evaluations using MATLAB simulator are conducted. The results indicate a potential throughput imbalance problem in heterogeneous 802.11ax networks, and show that the existing EDCA of Wi-Fi could be an effective solution to handle this.

Figure 14:
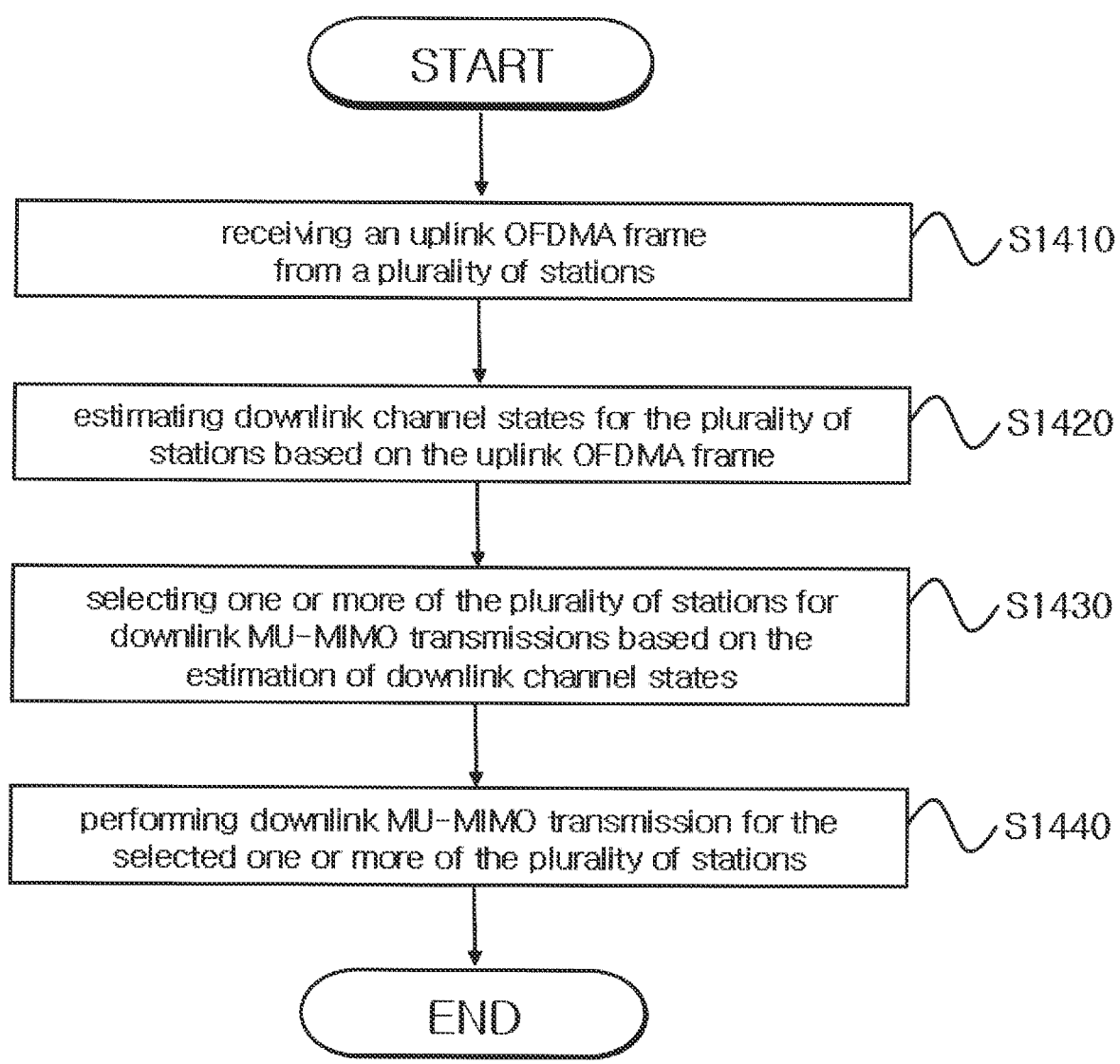
FIG. 14 shows a flow chart of a method for MU-MIMO transmission which can be conducted by an Access Point, according to one embodiment of the present disclosure.

With regard to this, FIG. 14 shows a flow chart of a method for MU-MIMO transmission which can be conducted by an Access Point, according to one embodiment of the present disclosure. As described in FIG. 14, the method for MU-MIMO transmission according to an embodiment of the present invention may be conducted by Access Point (AP), for example. However, any elements composing a wireless local area network (LAN) may conduct the method according to embodiments of the present disclosure.

Referring to FIG. 14, for example, AP may receive an uplink Orthogonal Frequency Division Multiple Access (OFDMA) frame from a plurality of stations S1410. Then, AP may estimate downlink channel states for the plurality of stations based on the uplink OFDMA frame S1420. And AP may select one or more of the plurality of stations for downlink MU-MIMO transmissions based on the estimation of downlink channel states for the plurality of stations S1430. After that, AP may perform downlink MU-MIMO transmission for the selected one or more of the plurality of stations S1440.

Figure 15:
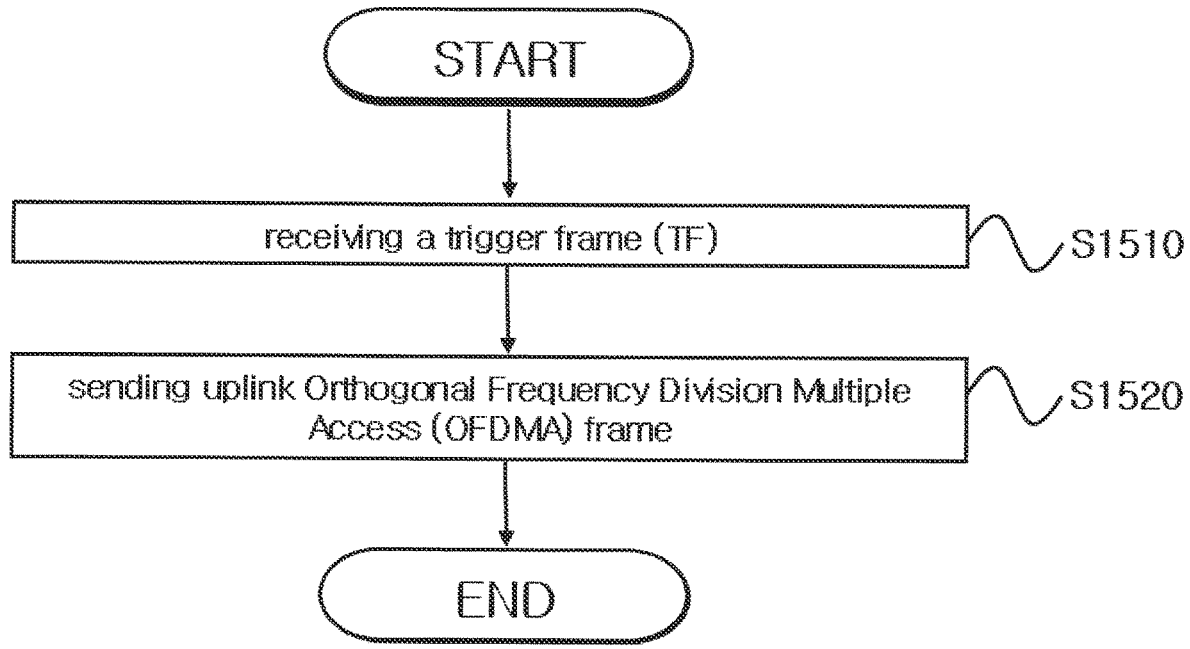
FIG. 15 shows a flow chart of a method for MU-MIMO transmission which can be conducted by a station, according to one embodiment of the present disclosure.

Meanwhile, FIG. 15 shows a flow chart of a method for MU-MIMO transmission which can be conducted by a station, according to one embodiment of the present disclosure. As described in FIG. 15, the method for MU-MIMO transmission according to an embodiment of the present invention may be conducted by an access point (AP), for example. However, any elements composing a wireless local area network (LAN) may conduct the method according to embodiments of the present disclosure.

Referring to FIG. 15, for example, a station may receive a trigger frame (TF) S1510. In an aspect, TF may be sent from AP. In response to receiving the TF, the station may send uplink Orthogonal Frequency Division Multiple Access (OFDMA) frame S1520. In an aspect, the uplink OFDMA frame may be sent to the AP. The uplink OFDMA frame may be used to estimate downlink channel states for a downlink MU-MIMO transmission.

Each step of the method according to embodiments of the present disclosure will be described more specifically at sections about MUSE below.

MU-MIMO

MU-MIMO enables the AP to send multiple data streams (up to the number of AP antennas theoretically) to multiple users via downlink, and was adopted for the first time in the Wi-Fi industry in 802.11ac WAVE 2. Although the maximum number of concurrent data streams is still limited to eight, many prototypes have been developed to show the feasibility of serving a much larger number of users and antennas.

Figure 1B:
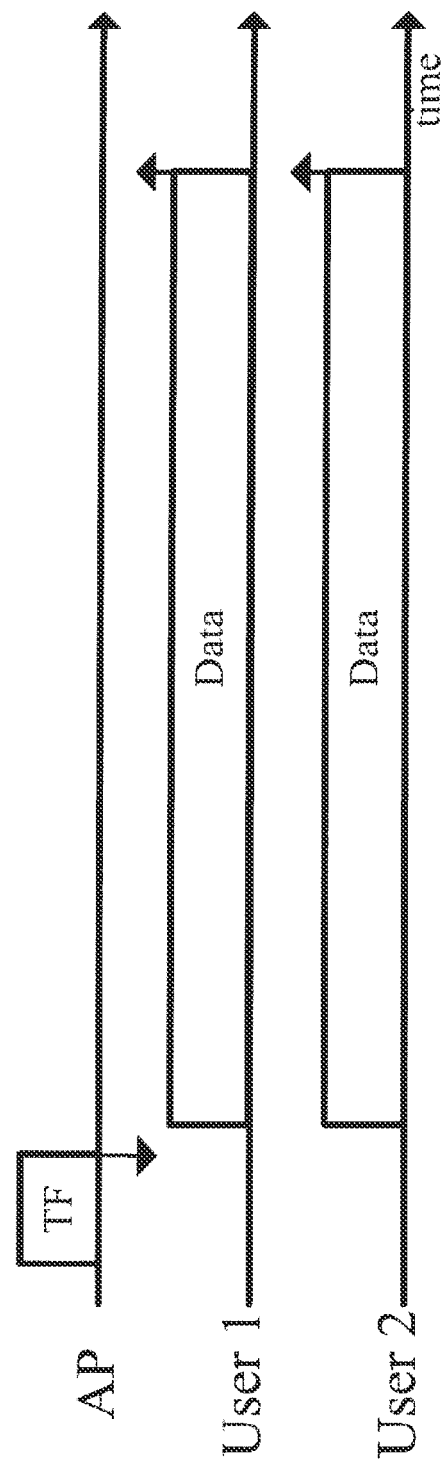

In such systems, in order to enjoy the benefits of MU-MIMO, the transmitter (e.g., the AP) needs to know the channel status of receivers a priori. To achieve this, the current MU-MIMO-based Wi-Fi systems use a series of poll-based CSI feedbacks for each user, as shown in FIG. 1A, but this approach may cause a high MAC overhead. Furthermore, CSI feedback is transmitted at a low basic rate (e.g., 6.5 Mbps), and grows as the number of transmitter/receiver antennas, the quantization level and the size of the subcarrier group increase. As mentioned earlier, the CSI feedback overhead could easily overwhelm the MU-MIMO diversity gain. In this regard, FIGS. 1A and 1B show the two multi-user transmission protocols in 802.11ax. With regard to FIG. 1A, in MU-MIMO, the AP requests CSI feedback frames from users to compute beamforming weights. 'CR' and 'CF' denote the CSI feedback request and CSI feedback, respectively. With regard to FIG. 1B, in uplink OFDMA transmission, the AP invokes uplink OFDMA transmissions from users by broadcasting a trigger frame (denoted as 'TF').

One way to resolve this problem is to compress the feedback frame and thus to reduce its size; however, the issue of how to determine the optimal compression level remains a concern. We can further lower the overhead by decreasing the number of feedback transmissions, by employing threshold-based techniques using SINR or exploiting the statistical model of channel coherence time. Although these schemes effectively decrease the number of feedback transmissions, they may result in throughput loss, since lower CSI feedback may offer diminishing returns.

Meanwhile, user selection has been highlighted in the field of MU-MIMO, since it can maximize the MU-MIMO gain. Optimal user selection, obtained through an exhaustive search over all possible user sets, provides the maximum capacity of the network, but this requires CSI from all users in the network and thus may be impractical with the current CSI acquisition protocol. In this vein, several user selection schemes show that they can provide high MU-MIMO gain that is comparable to the optimum, without an exhaustive search. Most of these approaches fill the receiver group with a user in every iteration, using their own selection criteria, and thus the total number of required iterations can be bounded to the maximum number of AP antennas. SUS finds the user with the largest norm of the projected channel to the orthogonal subspace of the previously selected users, but this approach assumes perfect CSI from all users at the AP, which is generally infeasible in the real world. A novel user selection scheme called OPUS is more practical than SUS, as it essentially inherits the existing 802.11ac protocol. OPUS selects the user with the highest potential (e.g., SINR) to boost the capacity in each round, which eventually results in a similar MU-MIMO gain to that of SUS. However, the additional time domain contention in OPUS may cause a non-negligible MAC overhead. In addition, it is obviously advantageous for MU-MIMO user selection when there are a large number of users from which to select; in this situation, however, it may be difficult to gain the benefits of user selection in current Wi-Fi systems, since it is difficult for the AP to get channel access due to severe channel contention. In order to take advantage of the benefits of user selection, the AP therefore needs to be provided with sufficient transmission opportunity.

In theory, there is no significant difference in the beamforming mechanism between the downlink and uplink MU-MIMO communications, but in practice, uplink MU-MIMO is much harder to implement, since it is challenging for distributed users to synchronize their transmissions. Although uplink MU-MIMO was intended to be employed in 802.11ax, it was deferred to WAVE 2, and thus MU-MIMO communication will be available only on the downlink at WAVE 1. Instead of MU-MIMO, 802.11ax proposes the use of OFDMA for uplink MU transmissions.

OFDMA

The basic mechanism of OFDMA is to divide a transmission across several sub-channels, which are referred to as resource units (RUs). In 802.11ax, which is the first Wi-Fi standard to adopt OFDMA, 20, 40, 80 and 160 MHz Wi-Fi channels can be divided into 9, 18, 37, and 74 RUs, respectively. Even before the development of 802.11ax, several mechanisms were proposed for the adoption of OFDMA in Wi-Fi systems. OFDMA can be used for channel access and can reduce the frame collision rate by conducting back off in both the time and frequency domains. A certain MAC protocol supports the use of OFDMA in Wi-Fi on top of the existing distributed MAC protocol, but this is entirely different from the current 802.11ax OFDMA MAC where the AP acts as a coordinator for OFDMA transmission. Another MAC protocol extends the use of the contention window for OFDMA resource allocation. Several control frames were designed to allow the AP to efficiently control both uplink and downlink OFDMA transmissions, and directly exploit the legacy point coordination function (PCF) for the same purpose. However, most of these works do not comply with the way OFDMA is used in 802.11ax.

Figure 2:
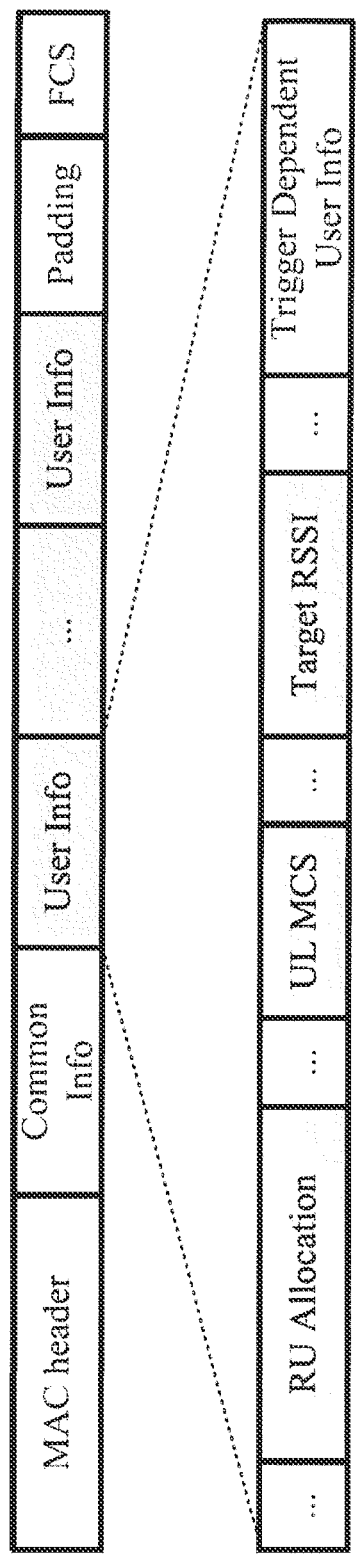
FIG. 2 shows a trigger frame structure.

With the advent of 802.11ax, OFDMA has significantly modified the characteristics of Wi-Fi; even the uplink transmissions are now controlled by the AP, rather than by users themselves. The introduction of a trigger frame (TF) is one of the representative new features of 802.11ax. By broadcasting a TF, an AP can invoke and synchronize the uplink user transmissions. In this regard, FIG. 2 shows a trigger frame structure. A trigger frame conveys several items required for uplink OFDMA transmission, such as the RU allocation result, modulation coding scheme (denoted as UL MCS), and target received signal power. FIG. 2 shows the TF structure, and from this we can see that it conveys several forms of meta-information that are required for the OFDMA transmission, such as which users should send data, which RUs the users should use, the duration of the corresponding OFDMA transmission, and even the transmission power level of each user. In addition, 802.11ax adopts several additional control frames to allow the AP to allocate OFDMA resources to users appropriately, such as a buffer status report poll (BSRP) and a bandwidth query report poll (BQRP). By using these, the AP can keep track of the buffer status and signal quality of OFDMA users.

Unlike MIMO techniques, OFDMA itself does not provide any capacity gains; instead, the data rate of each user may decrease when the channel bandwidth is shared with others, resulting in a longer transmission time. However, it significantly reduces contention and preamble overhead, and these savings are particularly effective and essential for dense network scenarios, where severe channel contention arises from large numbers of users. To deliver higher OFDMA gains, appropriate resource allocation and scheduling should be used, and optimal OFDMA resource allocation under diverse Wi-Fi scenarios has been addressed in many studies. For example, an adaptive EDCA mechanism for OFDMA resource scheduling could be utilized. And Lyapunov optimization techniques could be used to solve the resource allocation problem under average rate and power constraints. Certain study investigates the uplink OFDMA performance of different scheduling policies, such as max-rate, proportional fair and shortest remaining processing time. These schemes focus only on the performance of the uplink transmissions, rather than on the impact on the downlink. In contrast, MUSE takes both into account when allocating OFDMA resources, so that it can achieve benefits from both the OFDMA and MU-MIMO transmissions.

System Model

Figure 3:
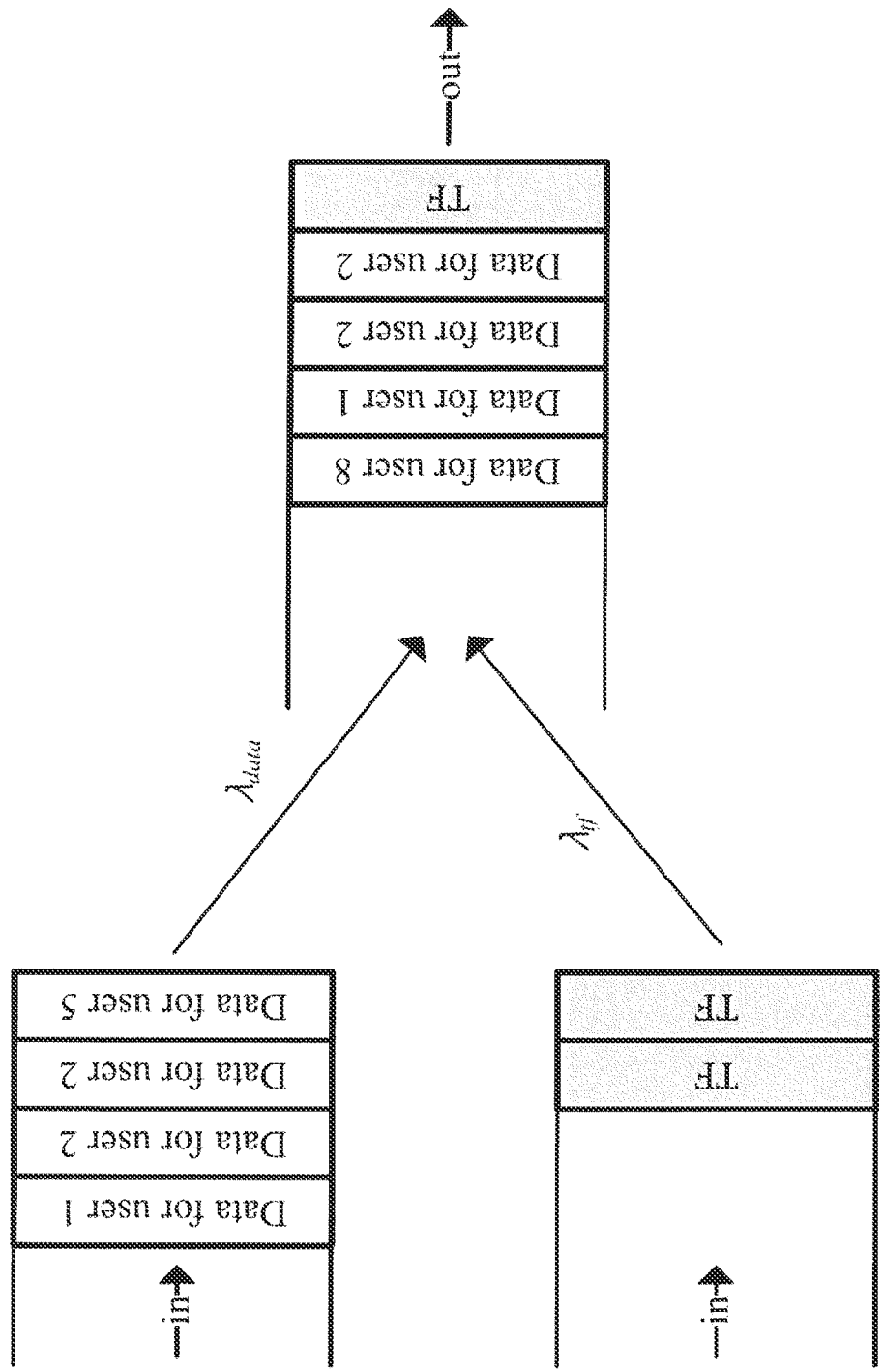
FIG. 3 shows a model of the AP transmission queue.

This specification considers a Wi-Fi network with one AP with M antennas and S single-antenna users, where M≤S. Users are located randomly within a circle of d radius around the AP. $P_{AP}$ and $P_s$ represent the maximum transmission power of the AP and user s, and a log-distance path loss model is used with a path loss exponent of two. Based on this model, Rayleigh fading is used for taking multipath fading into consideration. It is assumed that all of the nodes are equipped with both MU-MIMO and OFDMA functionalities, unless otherwise stated. In particular, OFDMA users could be assumed to be able to transmit via the TF of the AP; that is, OFDMA users don't need to transmit data via channel contention. Both the AP and users operate in unsaturated traffic conditions in which a data frame arrives at the transmission queue of each node in a Poisson manner, with rate $\lambda_{data}$. In this regard, FIG. 3 shows a model of the AP transmission queue. A TF and a data frame arrive at the transmission queue of the AP with rates λtf and λdata' respectively.

For the AP, in addition to the data frame, a TF reaches the transmission queue every 1 ms, as shown in FIG. 3. Any type of node, whether MUSE-capable or not, can transmit data for the maximum TxOP time (denoted as T) when it accesses the channel. A total of K sub-channels, i.e., RUs, are available for OFDMA.

FIG. 4 shows RU locations in a 20 MHz channel. There are 18 RUs, numbered from 0 to 17 here. FIG. 4 shows the RUs for a 20 MHz channel in 802.11ax. According to this standard, for a 20 MHz channel, each RU may consist of 26, 52, 106 and 242 tones, and a maximum of one RU can be assigned to a single user, regardless of the size of the RU. This specification assumes that users have heterogeneous maximum bandwidths; the AP and users may have different available channel bandwidths of between 20 MHz and 160 MHz (i.e., 20, 40, 80, and 160 MHz), and $B^{max}$ denotes the available channel bandwidth of the AP. For simplicity, the process by which users report their data and the received signal strength indicator (RSSI) via OFDMA random access is omitted from this specification, but this information is assumed to be available at the AP. For MU-MIMO, we may use zero-forcing beamforming (ZFBF) as the precoding strategy, since this effectively removes the mutual interference among concurrent transmissions by using a low-complexity precoding matrix computation.

User Selection of MU-MIMO

The key concept of MUSE is that an AP acquires CSI from the uplink OFDMA transmission and then exploits this to carry out MU-MIMO user selection. To achieve this, an integrated uplink and downlink transmission method is proposed.

Figure 5:
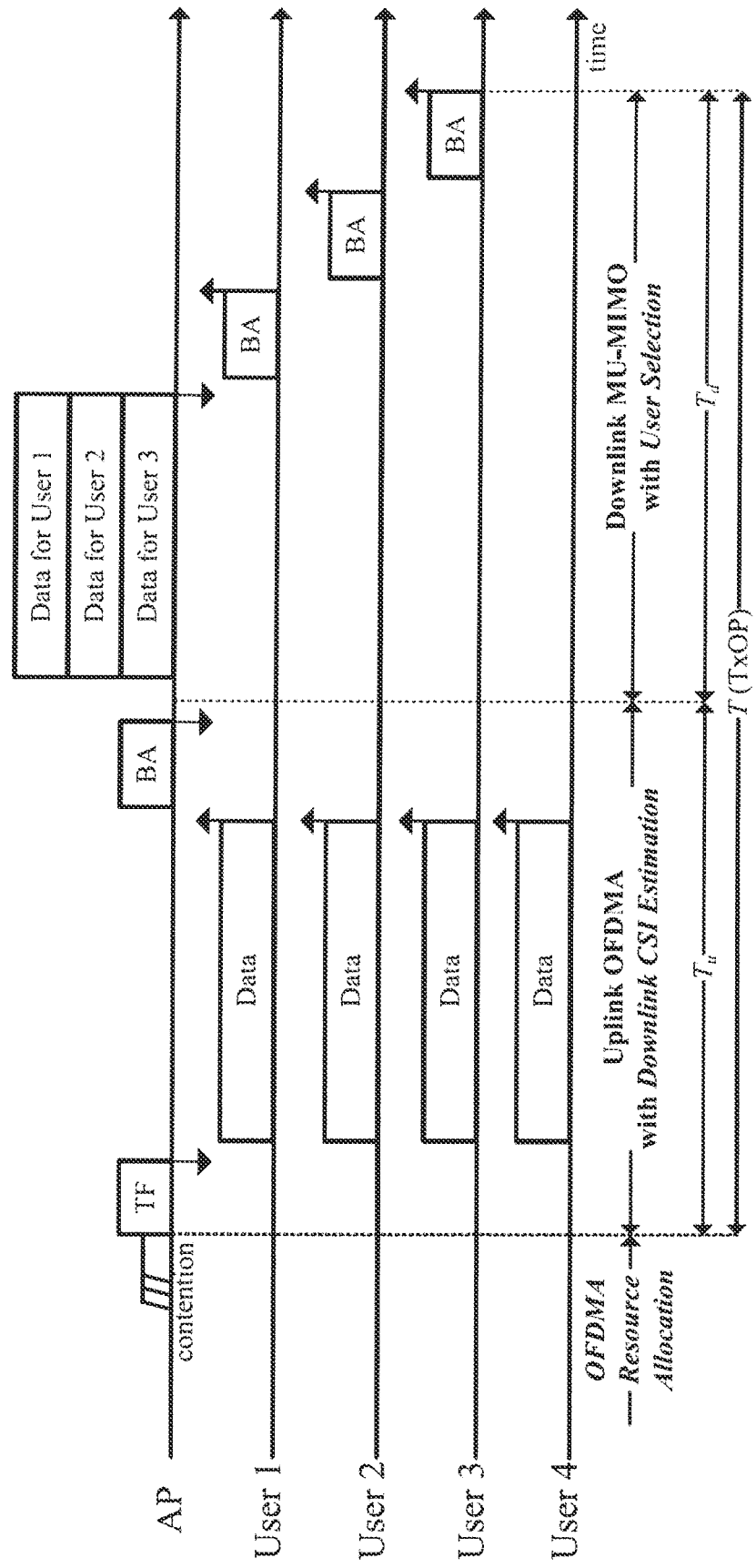
FIG. 5 shows Operational example of MUSE.

In this regard, FIG. 5 shows Operational example of MUSE. When the AP accesses the channel, it first invokes the uplink OFDMA transmission, and then starts the downlink MU-MIMO transmission. The AP estimates the downlink CSI from the OFDMA transmission, and exploits them to carry out MU-MIMO user selection. 'BA' stands for block ack. As shown in FIG. 5, when the AP obtains channel access, it first initiates an uplink transmission of users, and then starts to transmit via downlink MU-MIMO. This consecutive transmission is designed to occur within only one TxOP (i.e., T), thus ensuring that legacy nodes obtain sufficient transmission opportunities in MUSE; that is, the uplink transmission and the downlink transmission could be finished within Tu and $T_d$, respectively (i.e., $T=Tu+T_d$). In this regard, in the methods of embodiments according to the present disclosure, both receiving the uplink OFDMA frame and performing downlink MU-MIMO transmission may occur within one transmission opportunity (TxOP).

In addition to the integrated transmission method, more schemes are described to realize MUSE: 1) OFDMA resource allocation, 2) downlink CSI estimation, and 3) MU-MIMO user selection. When the AP is ready to send some frames, which may be either TFs or data frames (i.e., the transmission queue is not empty), it may attempt to access the channel through the conventional distributed coordinated function (DCF) mechanism of Wi-Fi. At the same time, it prepares for the uplink OFDMA transmission by executing resource allocation. The main purpose of this step is very similar to typical uplink OFDMA scheduling, and is to assign RUs to users to accomplish some system goal. In MUSE, however, the downlink MU-MIMO is also taken into account in the resource allocation step, since it eventually affects the downlink MU-MIMO performance. As a result, the resource allocation method which may be employed in MUSE enables the AP to acquire downlink CSI from up to $g^{max}$ users from every OFDMA frame.

In an aspect, receiving, by the AP, the uplink OFDMA frame from the plurality of stations comprises receiving an uplink OFDMA frame from one or more of stations which have no data to be sent. For example, we may obtain an estimation of downlink channel state for certain station by letting the certain station send an OFDMA frame to the AP, even when the certain station have no data to be sent to the AP. In this regard, when the AP allocates resources to stations, the AP may allocates at least part of resources in the OFDMA frame to some stations which have no data to be sent.

During the uplink transmission, the AP not only decodes the OFDMA data but also estimates the downlink CSI of users. The channel reciprocity used here converts the CSI for the uplink channel into that for the downlink. The new OFDMA frame structure proposed in MUSE helps the AP to effectively estimate the downlink CSI of users for MU-MIMO. If the channel estimation is successfully completed, then the AP may obtain multiple CSI values for up to $g^{max}$ users; based on these values, it computes the optimal MU-MIMO receiver group, and then transmits to these users. In the example shown in FIG. 5, four users (Users 1 to 4) transmit data via OFDMA, and the AP then computes the optimal MU-MIMO group (i.e., Users 1, 2 and 3 in this example) using the estimated CSI values.

The distinctive method of transmission in MUSE can provide several advantages to the network system. Firstly, we can easily obtain MU-MIMO diversity gains with sufficient numbers of CSI values. Secondly, an additional process of acquiring CSI feedback to carry out MU-MIMO user selection is no longer needed, and hence the MAC overhead can be greatly reduced. Lastly, modifications to the existing protocol are rarely required to implement MUSE, and the system is also backwards compatible; MUSE does not reduce the performance for legacy users, and instead provides performance advantages. Each scheme used in MUSE is elaborated in detail hereinafter.

OFDMA Frame Structure

In some methods for MU-MIMO according to embodiments of the present disclosure, uplink OFDMA frame may comprise at least one channel estimation slot. The channel estimation slot may be configured to allocate wider channel bandwidth to at least one of the plurality of stations than a channel bandwidth by OFDMA resource allocation.

More specifically, in OFDMA, the receiver is able to learn each sub-channel through dedicated subcarriers; however, this CSI is for the uplink channel, which is not directly applied to downlink MU-MIMO. As mentioned above, MUSE exploits channel reciprocity, which is known to be well-suited to channel training in many wireless systems. For example, in some study channel reciprocity allows users to estimate the uplink channel from the beacons, and in another study that demonstrated its feasibility in massive MIMO scenarios. On this basis, it is assumed throughout this specification that once the uplink channel state is given, then it is also possible to estimate the downlink channel state. Elaborating on how to improve channel reciprocity performance is beyond the scope of this work, but we briefly explain several approaches to achieving the channel reciprocity.

For a given channel, let $h_u$ and $h_d$ be the uplink channel coefficient and the downlink channel coefficient, respectively. Then, with the channel reciprocity, $h_d$ can be expressed as a function of hu:

$$h_d = \sqrt{\theta} \cdot h_u + \sqrt{1-\theta} \cdot e \quad (1)$$

Wherein θ is defined as the channel reciprocity coefficient between the uplink and downlink channels, where 0≤θ≤1, and e is the uncertain part of $h_u$.

Finding suitable calibration parameters to compensate for the unknown amplitude scaling and phase shift between the two channels is a key factor in achieving channel reciprocity. One way to realize this is to calibrate each transmitter and receiver, and specific hardware (e.g., op-amp, external source) is typically required to ensure reciprocity. This solution aims to achieve exact calibration between transceivers (and thus is also known as absolute calibration); however, it is expensive to implement in the context of commodity devices. For this reason, many studies use a method of relative calibration in which the calibration is conducted entirely in signal space, and this eliminates the need for external reference hardware. This method may produce higher calibration errors compared to absolute calibration; however, its feasibility has already been demonstrated to some extent in many experimental studies, including the aforementioned systems.

Figure 6A:
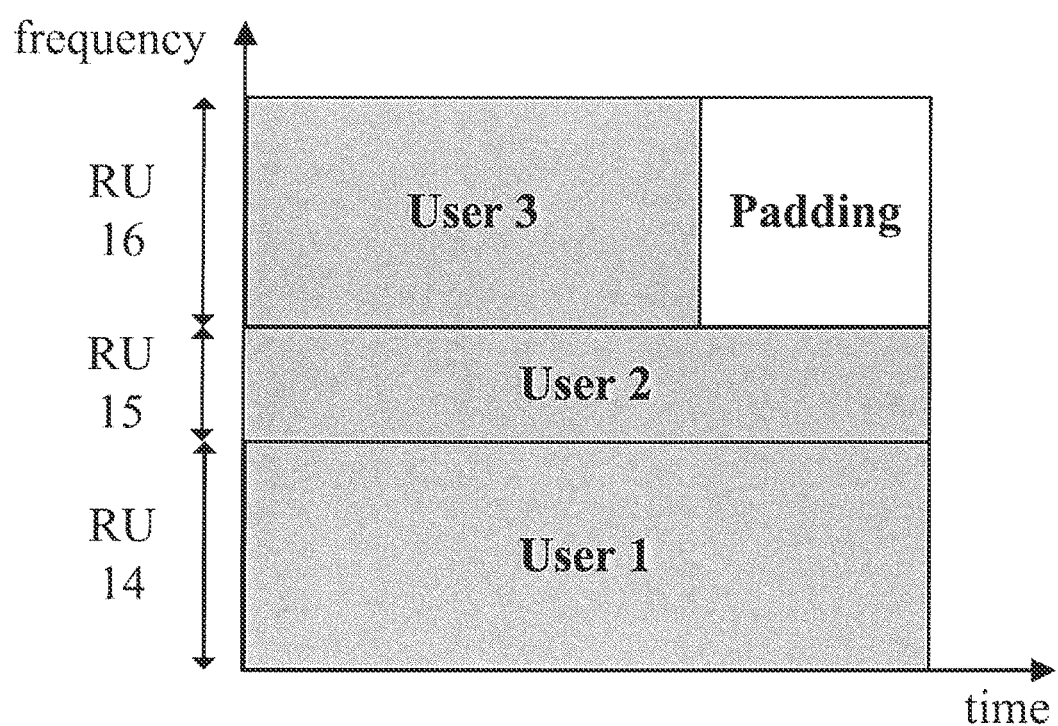
FIGS. 6A and 6B show Comparison between legacy and proposed OFDMA frames.
Figure 6B:
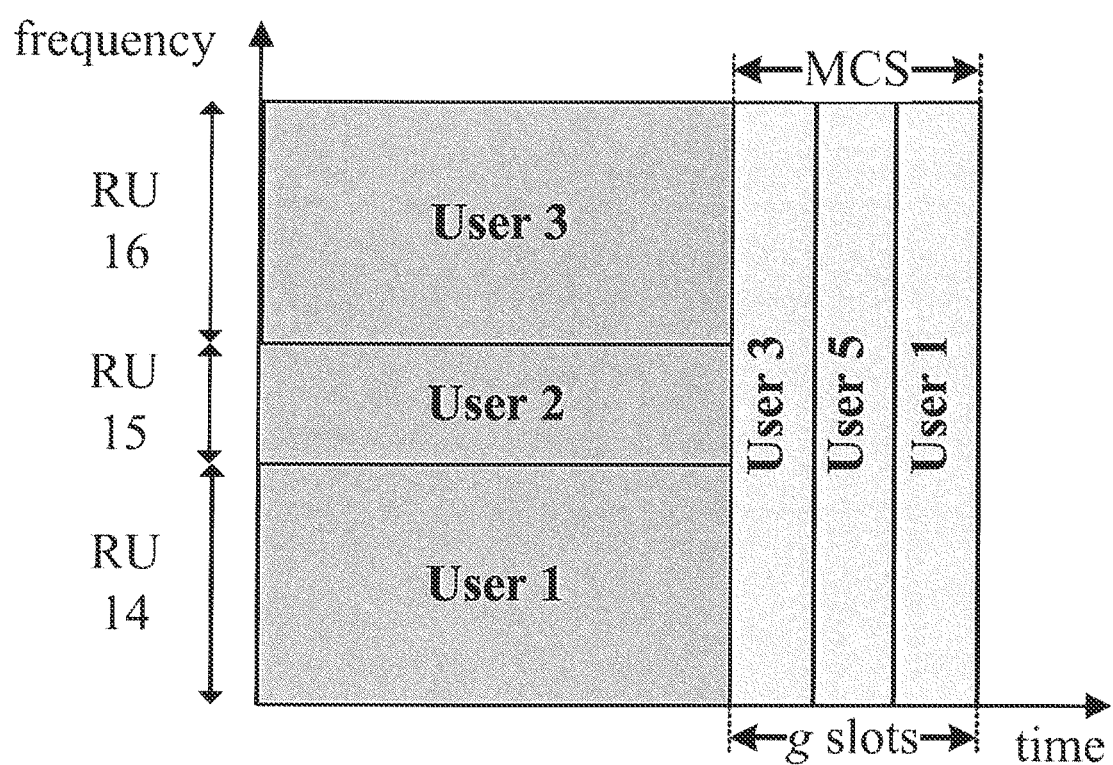

As previously described, a MUSE AP needs to estimate the CSI of several users from the OFDMA frame. However, we cannot achieve this goal with the legacy OFDMA frame structure. In this regard, FIGS. 6A and 6B show Comparison between legacy and proposed OFDMA frames. In the proposed OFDMA frame, for the last g slots, all sub-channels required for MU-MIMO are allocated to a user so that the AP can estimate the CSI of the user over the channel. If OFDMA resource allocation assigns only some parts of the whole channel to users, as shown in FIG. 6A, then the estimated CSI values for these users may be insufficient for MU-MIMO beamforming, which generally requires the channel states for a sufficient channel bandwidth (e.g., at least 20 MHz). To handle this issue, MUSE may separate an OFDMA frame into two parts, and utilize one of them for dedicated CSI estimation. This section may be called the MUSE CSI estimation section (MCS). Hereinafter, MCS may be also referred as 'channel estimation slot'. As shown in FIG. 6B, the MCS may consist of g small slots (0≤g≤$g^{max}$), and only one user can be assigned to each slot. Once a user is assigned, then the whole channel bandwidth required for MU-MIMO is given to the user, so that the AP can estimate the CSI for the entire channel. In an aspect, a channel estimation slot according to an embodiment of the present disclosure may be configured to allocate wider channel bandwidth to at least one of the plurality of stations than a channel bandwidth by OFDMA resource allocation. More specifically, the whole channel bandwidth required of MU-MIMO may be allocated to a user.

In the example shown in FIG. 6B, Users 1, 3 and 5 are given the three slots, and thus the AP can obtain the CSI for these users, which then become the candidates for the following downlink MU-MIMO transmission. One may consider that a fairness issue may arise especially in heterogeneous bandwidth user scenarios, since heterogeneous users cannot be part of the same slot in the proposed allocation scheme. This problem, however, can be tackled through adopting appropriate scheduling policies in MUSE resource allocation, which will be described later.

Since MCS is a dedicated part of CSI estimation, users of MCS transmit training symbols by appending the PHY header (i.e., PLCP header). In order to reduce the inter-user interference between user transmissions in MCS, a guard interval needs to be inserted between each slot. Taking all these considerations into account, the length of each slot (denoted as τ) is set to 100 us, which is longer than the typical PLCP header transmission time.

Meanwhile, in some methods for MU-MIMO according to embodiments of the present disclosure, at least one channel estimation slot may be located at the end of the uplink OFDMA frame. More specifically, from FIG. 6B, we can also see that the MCS may be located at the end of the frame. Since the channel state changes over time and is valid only for the channel coherence time, which is generally on the order of 10 ms, the CSI estimated at the beginning of the frame may be invalid for the MU-MIMO transmission. This also has the effect of limiting the number of possible g values (i.e., $g^{max}$). As expected, the value of g is a tradeoff between MU-MIMO gain (i.e., data rate) and data transmission time: a large g value benefits from higher MU-MIMO diversity gains at the expense of a reduced data transmission time, and vice versa. In order to find the optimal g value (denoted as $g^{opt}$), MUSE takes into account the effect of g on performance in resource allocation, which will be explained in the next subsection. Note that when $g^{opt}$ is determined, TxOP is then reconfigured by reducing both $T_u$ and $T_d$ by half the length of the MCS $$T_u -= \frac{\tau \cdot g^{opt}}{2} \text{ and } T_d -= \frac{\tau \cdot g^{opt}}{2} \text{)}.$$

Muse Resource Allocation

As previously described, unlike in conventional OFDMA scheduling, MUSE resource allocation needs to consider the performance of the downlink MU-MIMO as well as that of the uplink OFDMA transmission. The size of the MCS also needs to be taken into account, since this has a huge impact on MUSE performance; as more resources are allocated to the MCS, the MU-MIMO diversity gain increases, while the time for actual data transmission is reduced. In this regard, in some methods for MU-MIMO according to embodiments of the present disclosure, uplink OFDMA frame may be configured to allocate resources to the plurality of stations based on a performance of both the uplink OFDMA transmission and the downlink MU-MIMO transmission. For example, the performance of the uplink OFDMA transmission may comprise obtaining data transmission time for the uplink OFDMA transmission, and the performance of the downlink MU-MIMO transmission may comprise obtaining a downlink MU-MIMO diversity gain. In an aspect, the allocating resources may comprise regulating the number of the channel estimation slot in the OFDMA frame.

More specifically, in MUSE, the resource allocation may refers to assign users to the OFDMA frame described in the previous subsection (see FIG. 6B), for achieving a certain system goal. As shown in FIG. 6B, there are two types of resources to allocate: K RUs for uplink OFDMA data transmission and g users for downlink channel estimation. We then define two decision variables, $x_{sk}$ and $y_s$, corresponding to each case: $x_{sk}=1$ if user s is assigned RU k, or 0 otherwise, and $y_s=1$ if user s is selected for MCS, or 0 otherwise. In addition, we define $X \in \{0, 1\}^{S \times K}$ and $Y \in \{0, 1\}^S$ to denote all possible configurations of $x_{sk}$ and $y_s$. Then, resource allocation can be formulated as the following utility maximization problem (called the MUSE resource allocation problem (MRAP)):

$$\text{MRAP} \quad \underset{(X,Y) \in A}{\text{maximize}} \; U^{ul}(X) + U^{dl}(Y) \quad (2)$$

where $U^{ul}(\cdot)$ and $U^{dl}(\cdot)$ are the utility functions of the uplink and downlink, respectively. A is the set of all possible combinations of the pair X and Y.

The constraints on MRAP are given as follows:

$$\sum_{s \in S} x_{sk} \leq 1, \forall k \quad (3)$$

$$\sum_{k} x_{sk} \leq 1, \forall s \quad (4)$$

$$x_{sk} \leq B_{sk}, \forall s, k \quad (5)$$

$$\sum_{s \in S} x_{sk} \cdot v_k \leq K^{max}, \quad (6)$$

$$\sum_{s \in S} y_s = g, \quad (7)$$

$$x_{sk} \in \{0, 1\}, \forall s, k \quad (8)$$

$$y_s \in \{0, 1\}, \forall s \quad (9)$$

where $S$ and $K$ are the set of users and that of RUs, respectively.

Constraints (3) to (6) are for the compliance with the RU usage of 802.11ax, as described in Section III-A. Constraint (3) states that an RU cannot be assigned to more than one user, and Constraint (4) means that a user can be assigned one RU at most. Constraint (5) represents the maximum bandwidth limitations of users, and $B_{sk}$ is a binary value that is set to $B_{sk}=1$ if user s is capable of RU k, and 0 otherwise. Constraint (6) ensures that the total width of the allocated RUs should not exceed the given whole channel width (denoted as $K^{max}$, and for example $K^{max}=74$ when $B^{max}=160$, as explained in Section II). $v_k$ is defined as the relative size of RU k to the smallest RU size. For example, assuming that the smallest RU size is 1 (e.g., RU 0 to RU 8, RU 11 and RU 15 in FIG. 4), $v_0=1$, $v_{10}=2$, $v_{14}=4$ and $v_{17}=9$. However, this constraint cannot guarantee the condition that the allocated RUs should not overlap each other. Instead of adding another constraint, a simple approach may be used to handle this issue: if a solution is obtained with overlapping RUs, these are rearranged. For example, if the solution to the MRAP includes both RU 1 and RU 9, then we can prevent overlap by reassigning one of these two users to another RU (e.g., RU 2 instead of RU 1, or RU 10 instead of RU 9). Constraint (7) states that the total number of selected users for downlink channel estimation should be equal to g. Constraints (8) and (9) indicate that the decision variables should be binary.

As shown in Constraint (7), the MRAP is formulated for a fixed g value, but we need to consider the optimal g value (i.e., $g^{opt}$), since this affects the MUSE resource allocation performance: a value of g that is too high results in a high MU-MIMO diversity gain with a short transmission time, and vice versa. To do this, the MRAP is evaluated and compared for every possible g value. More specifically, the decay factor $\delta$ ($0 < \delta \leq 1$) is multiplied by the computed sum-utility in every iteration to take into account the losses caused by g.

The proposed method is summarized in Algorithm 1 of FIG. 13. FIG. 13 shows MUSE Resource Allocation Algorithm. The process of determining the bandwidth for downlink MU-MIMO (from line 6) should be noted. Unlike uplink OFDMA resource allocation, users with different channel bandwidths cannot be grouped together in MU-MIMO. For example, if the maximum channel bandwidths of Users 1 and 2 are 20 and 80 MHz, and they are grouped in the MU-MIMO scheme, then the actual MU-MIMO transmission is performed only on the 20 MHz channel. In order to take into account the bandwidth heterogeneity between users, the algorithm simply evaluates and compares the utility values for different channel bandwidths for MU-MIMO. In this process, the number of candidate users for the MU-MIMO group may vary in each iteration. For example, suppose that of a total of 10 users, five can use a channel of up to a 20 MHz and another five users can use 40 MHz. The algorithm first examines the utility value under a maximum total bandwidth of 20 MHz, and in this case, all 10 users can be candidates for the MU-MIMO transmission group. The same process is repeated for a bandwidth of 40 MHz, and the number of candidates is reduced to five.

Now, let us see how each utility function is defined. Both are represented as the sum of utility values:

$$U^{ul}(X) = \sum_{s \in S} \sum_{k} x_{sk} \lambda_{sk}^{ul} \quad (10)$$

$$U^{dl}(Y) = \sum_{s \in S} y_s \lambda_s^{dl} \quad (11)$$

where $\lambda_{sk}^{ul}$ denotes a utility value that user s can obtain through RU k in uplink OFDMA transmission, and $\lambda_s^{dl}$ denotes that obtained when user s is selected for downlink MU-MIMO transmission. These two values are defined in the same form:

$$\lambda_{sk}^{ul} = \frac{(\hat{r}_{sk}^{ul})^\alpha}{(\bar{r}_s^{ul})^\beta} \quad (12)$$

$$\lambda_s^{dl} = \frac{(\hat{r}_s^{dl})^\alpha}{(\bar{r}_s^{dl})^\beta} \quad (13)$$

where $\hat{r}_{sk}^{ul}$ and $\bar{r}_s^{ul}$ are the currently supported data rate of user s on RU k in uplink OFDMA and the historical average data rate of user s. Similarly, $\hat{r}_s^{dl}$ and $\bar{r}_s^{dl}$ are the supported data rate of the AP to user s in the downlink MU-MIMO and the historical average data rate of the AP to user s, respectively. Parameters α and β control the fairness policy of the system, and several well-known policies can be stated using α and β, as follows:

α=1 and β=0: max-rate (MR)

α=0 and β=1: round-robin (RR)

α=1 and β=1: proportional fair (PF).

The typical behavior of MR scheduling is that the user with the highest channel quality and the largest channel bandwidth is selected. This obviously maximizes the sum rate, but may also suffer from the starvation problem if some users with low channel qualities or narrow channel bandwidths cannot be served. PF scheduling can provide relatively fair scheduling performance compared to MR, at the expense of a reduced sum rate, and RR serves all users with equal frequency, with no regard for resource consumption. Note that these scheduling policies are applied to both uplink and downlink transmissions, as shown in Eq. (10) and (11).

$\hat{r}_{sk}^{ul}$ can be measured from the RSSI report of user s. Recall that 802.11ax enables the AP to measure the RSSI values of users, and these are used to set transmission powers of users for successful OFDMA transmission. Let $\gamma_s P_s$ be the received SNR at the AP for user s, where $\gamma_s$ is the path loss factor of s. Then, $r_{sk}^{ul}$ can be obtained from $R(\gamma_s P_s, b)$, where $R(\gamma_s P_s, b)$ is a function returning the data rate corresponding to the received SNR $\gamma_s P_s$ for the MU-MIMO channel bandwidth of b. Table 1 shows the mapping of the required SNR to the data rate for a 20 MHz channel (i.e., b=20).

TABLE 1

| Data Rate (Mbps) | Required SNR (dB) |
|---|---|
| 6.5 | 4 |
| 13 | 6.5 |
| 19.5 | 9.75 |
| 26 | 13 |
| 39 | 17.25 |
| 52 | 18.75 |
| 58.5 | 19.75 |
| 65 | 21 |
| 78 | 23 |

Based on this table, throughout this specification, it is assumed that available data rates increase linearly with channel bandwidth. Besides, to account for SNR losses due to the use of wider channel bandwidths, for simplicity, the received SNR is assumed to decrease by 3 dB each time the channel bandwidth is doubled. Unlike when computing $\hat{r}_{sk}^{ul}$, we cannot measure $\hat{r}_s^{dl}$ at this point, since there are no available CSI values. For this reason, $\hat{r}_s^{dl}$ is estimated here by adopting the MU-MIMO capacity model in which the total capacity of MU-MIMO grows asymptotically, at the rate shown in the following equation:

$$M \log\left(1 + \frac{P_{AP}}{M}\log S\right). \quad (14)$$

Eq. (14) shows that the received SNR for each user in MU-MIMO transmission is inversely proportional to the total number of transmitted streams (i.e., M), and also increases logarithmically with the total number of candidate users (i.e., S). In addition to this result, considering the fact that total g candidates are available in each MRAP, we have:

$$\hat{r}_s^{dl} = R\left(\frac{P_{AP}}{M}\log g, b\right). \quad (15)$$

Note that both $\hat{r}_s^{dl}$ and $\hat{r}_{sk}^{ul}$ are zero if the associated data are not available (e.g., if the AP has no data to send to user s, then $\hat{r}_s^{dl}$=0).

The optimization problem formulated here is an integer programming problem that is NP-complete, and several strategies are available to address this type of problem. One of the simplest ways is to remove the constraint that the variables should be binary (e.g., Constraint (8) and (9)), to solve the LP relaxation, and then to round the solutions. Although this approach is simple, the solution is not always guaranteed to be optimal, and may not even be feasible. Another well-known method, branch and bound, operates based on the principle that the total set of feasible solutions can be partitioned into smaller subsets of solutions. These smaller subsets can then be evaluated recursively until the optimal solution is found. In this study, the MATLAB solver with the branch and bound technique is used for evaluation.

Actual User Selection for Downlink

After the uplink OFDMA transmission, the AP may obtain the CSI of $g^{opt}$ users. Let $\mathcal{S}_g$ be the candidate user group. Unlike in the resource allocation step, where the CSI values are not available, in this step the AP can perform a more practical user selection with CSI values that have actually been gathered. The optimal user selection is formulated here in a similar way to MRAP, but a different approach is applied to compute $\hat{r}_s^{dl}$, as follows:

$$\underset{Y \in \mathcal{A}_y}{\text{maximize}} \; U^{dl}(Y) \quad (16)$$

where $\mathcal{A}_y$ is a set of Y. Note that for users not belonging to $\mathcal{S}_g$, $y_s$ should be 0, and this constraint is omitted since it is so straightforward.

In ZFBF, the precoding matrix for the group $\mathcal{S}_g$, denoted by $W(\mathcal{S}_g)$ is obtained as:

$$W(\mathcal{S}_g) = H(\mathcal{S}_g)^\dagger = H(\mathcal{S}_g)^*(H(\mathcal{S}_g)H(\mathcal{S}_g)^*)^{-1}, \quad (17)$$

where $(\cdot)^\dagger$, $H(\mathcal{S}_g)$, and H* and stand for a pseudo-inverse, the channel matrix of $\mathcal{S}_g$, and the conjugate transpose of H.

Assuming an equal power allocation, we finally have the following for $s \in \mathcal{S}_g$:

$$\hat{r}_s^{dl} = R(\|w_s\|^2 \hat{P}_s, b^{opt}) \quad (18)$$

where $$\hat{P}_s = \frac{P_{AP}}{M}$$

and $w_s$ is an element of $W(\mathcal{S}_g)$. Here, $\|w_s\|^2 \hat{P}_s$ can be interpreted as the received SNR of user s.

Note that since the above equations can be applied for the CSI of each subcarrier in OFDMA based systems, we need to integrate all of the results, and in this specification the average value is used for this, as in conventional MU-MIMO user selection schemes.

If there are No Frames for Uplink or Downlink Transmission

MUSE obtains a performance gain by using uplink transmission opportunities to carry out user selection for MU-MIMO. In this process, even if there are no users needing uplink transmission, some of them may be requested to send frames for CSI estimation. In this case, MUSE works similarly to traditional 802.11ac, with the difference that it generally requires more channel feedback (i.e., $g^{max} \geq M$). This may result in a slight increase in CSI feedback overhead compared to existing 802.11ac, but this loss can be offset by the increase in network capacity via user selection. If the uplink traffic in the network is low, the gains made by both MUSE and 802.11ax, which employ uplink MU transmission techniques, may become marginal; however, as mentioned earlier, many interactive applications and services continuously increase demand over uplink traffic, which implies that as long as there is sufficient uplink traffic, MUSE will deliver performance gains. Similarly, if the AP has no data frames for downlink transmission, then MUSE operates in the same way as 802.11ax. Note that in both cases, the TxOP value should be reconfigured to T, since only transmission in only one direction is available.

Performance for Different Traffic Types

MUSE is built on top of the existing MAC protocol of the 802.11 family, and hence inherits the nature of random access. Although the Poisson model, one of the simplest traffic models, is used for performance evaluation in this specification, various traffic types may be present. In order to effectively handle them and achieve high levels of quality of service (QoS), a number of features have already been employed in Wi-Fi networks; frame aggregation and block ack can be used for frame bursting, and EDCA can be applied to prioritize delay-sensitive voice or video traffic; TxOP prevents low-rate nodes from occupying the medium for an excessively long time. These features are complementary to MUSE, meaning that it can handle various traffic types by employing them appropriately.

Performance Evaluation

Evaluation Settings

In this section, the performance of MUSE is evaluated and analyzed via MATLAB simulations. In addition to MUSE, the following three schemes are implemented:

802.11ac: This is the legacy 802.11ac protocol with downlink MU-MIMO enabled. The user group for MU-MIMO is generated using a first-input first-output (FIFO) approach.

OPUS: This is a MU-MIMO user selection protocol based on 802.11ac, but has no OFDMA functionalities.

802.11ax: This is the 802.11ax protocol with both uplink OFDMA and downlink MU-MIMO enabled. For MU-MIMO, the same technique is used as in 802.11ac.

TABLE 2

| Parameter | Value |
| --- | --- |
| minCW | 31 |
| d | 50 m |
| Payload Size | 1500 Bytes |
| Maximum Bandwidth | 20 MHz |
| Basic Rate | 6.5 Mbps |
| $K^{max}$ | 9 |
| T | 5 ms |
| $T_u = T_d$ | 2.5 ms |

TABLE 2-continued

| Parameter | Value |
| --- | --- |
| S | 40 |
| $\lambda_{data}^s$ | 200 frames/s |
| $\lambda_{data}^{AP}$ | $\lambda_{data}^s \times S$ frames/s |
| $\lambda_{tf}$ | 1000 frames/s |
| $g^{max}$ | 8 |
| $\delta$ | 0.8 |
| M | 4 |
| $P_{AP} = P^s$ | 20 dB |
| Scheduling Policy | MR |

The simulation parameters are set to the default values in Table 2. Each simulation is run for 10 minutes and is repeated 100 times. In the results, user throughput means the total throughput of users, and system throughput is the sum of the AP throughput and the user throughput. A maximum available bandwidth of 20 MHz is applied to both the users and the AP, unless otherwise stated. In addition, to reflect the fact that downlink traffic predominates in the real world, the frame arrival rate of the AP is set to $\lambda_{data}^s \times S$ in the evaluations. The default values of some other parameters, such as $T_u$, $T_d$, and $\lambda_{tf}$, are chosen experimentally, though they may affect the performance greatly.

Effect of $\delta$ Values

Figure 7:
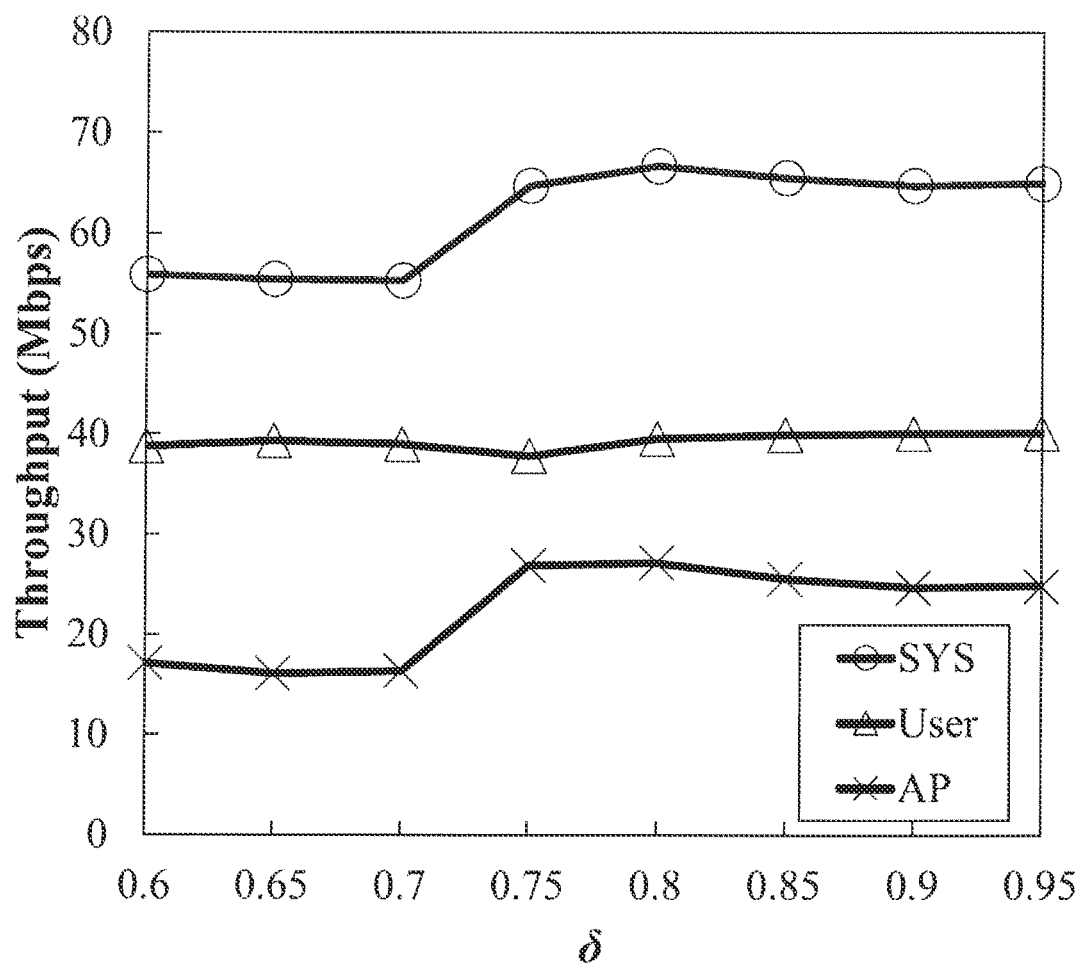
FIG. 7 shows Throughput vs. δ.

The value of $\delta$ plays an important role in reflecting the performance penalty of using g in MUSE resource allocation. FIG. 7 shows Throughput vs. $\delta$. The value of $\delta$ strongly affects the performance of the AP, and thus the system performance. More specifically, FIG. 7 shows the throughput of the AP, the users and the system for $\delta$ values varying from 0.6 to 0.95. From the system throughput result, we can see that the performance improves with $\delta$ until it reaches a certain point, and then starts to decrease. In particular, as the $\delta$ value increases from 0.7 to 0.75, the throughput of the AP is significantly improved, implying that a value of $\delta$ that is too low overestimates the disadvantage of g, thus giving a low degree of multi-user diversity.

Heterogeneous Maximum Bandwidths of Users

Figure 8:
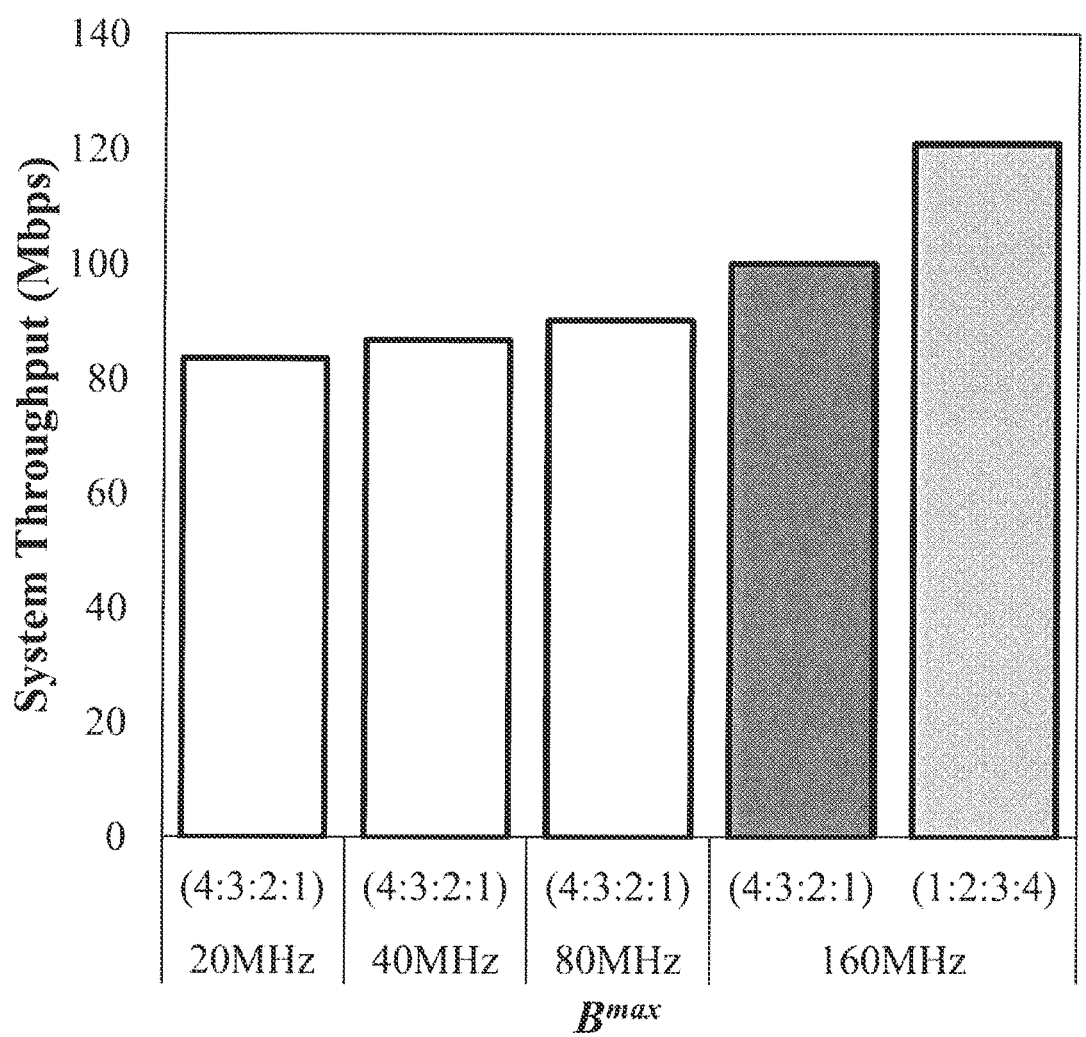
FIG. 8 shows System throughput vs. bandwidth configurations of nodes.

The resource allocation in MUSE is designed to support different maximum bandwidths of users. To evaluate this, the system throughput for various bandwidth configurations of nodes is compared in FIG. 8. FIG. 8 shows System throughput vs. bandwidth configurations of nodes. Both the total available bandwidth and the user configuration greatly affect the system throughput. The proportions of users with maximum bandwidths of 20, 40, 80, and 160 MHz are varied in each evaluation, as is the value of $B^{max}$. In the results, the notation (4:3:2:1) is used to represent a scenario where the numbers of users with maximum bandwidth 20, 40, 80, and 160 MHz are 16, 12, 8, and 4, respectively, and vice versa for (1:2:3:4).

From the results, we can see that both the total available bandwidth (i.e., $B^{max}$) and the configuration strongly affect the system throughput. Firstly, as expected, the system throughput increases with $B^{max}$. If the total available bandwidth of the AP is sufficiently large, more users can be scheduled on OFDMA transmissions, and the total data rate for MU-MIMO increases significantly. This gain can be further increased when there are more users that are capable of a wider bandwidth in the network. As shown in FIG. 8, for a bandwidth of 160 MHz, the system throughput for the case of (1:2:3:4) is 20% higher than that for (4:3:2:1).

Throughput vs. S

Figure 9A:
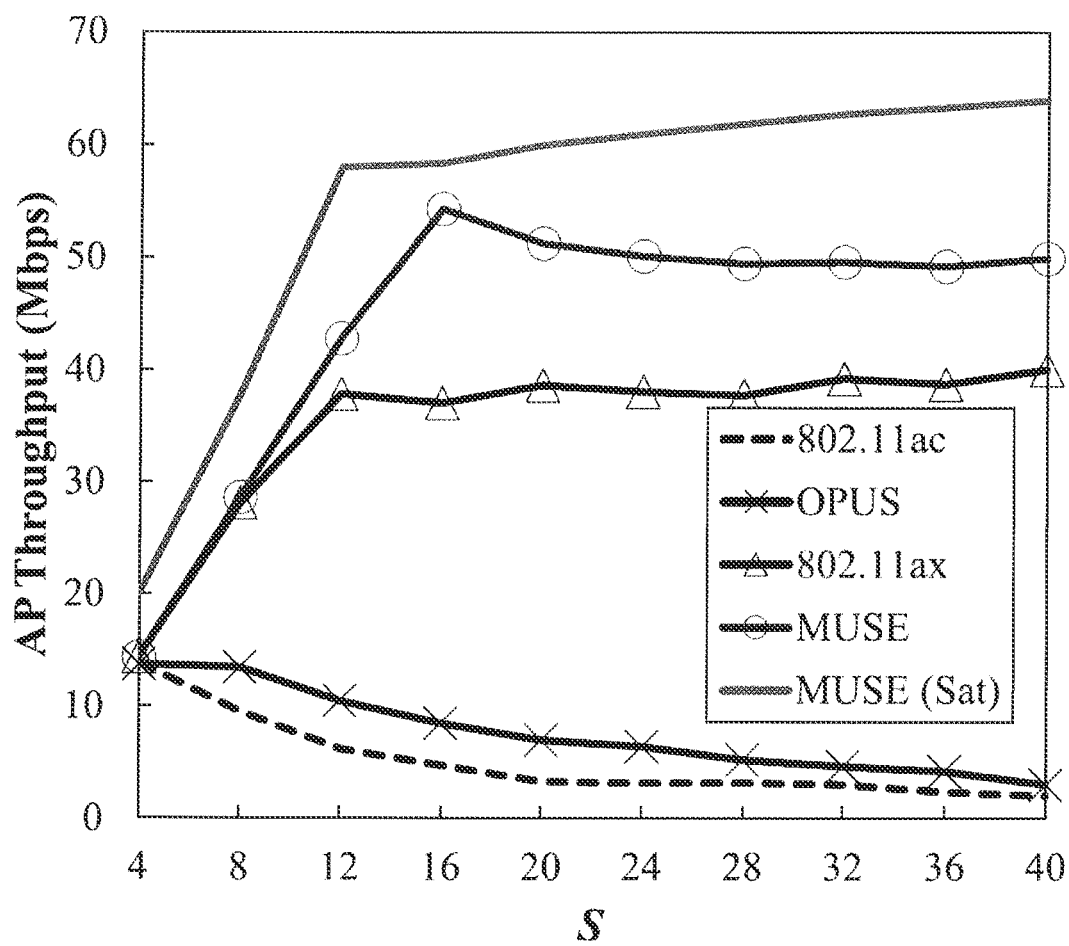
FIG. 9A to 9C show Throughput vs. S.
Figure 9B:
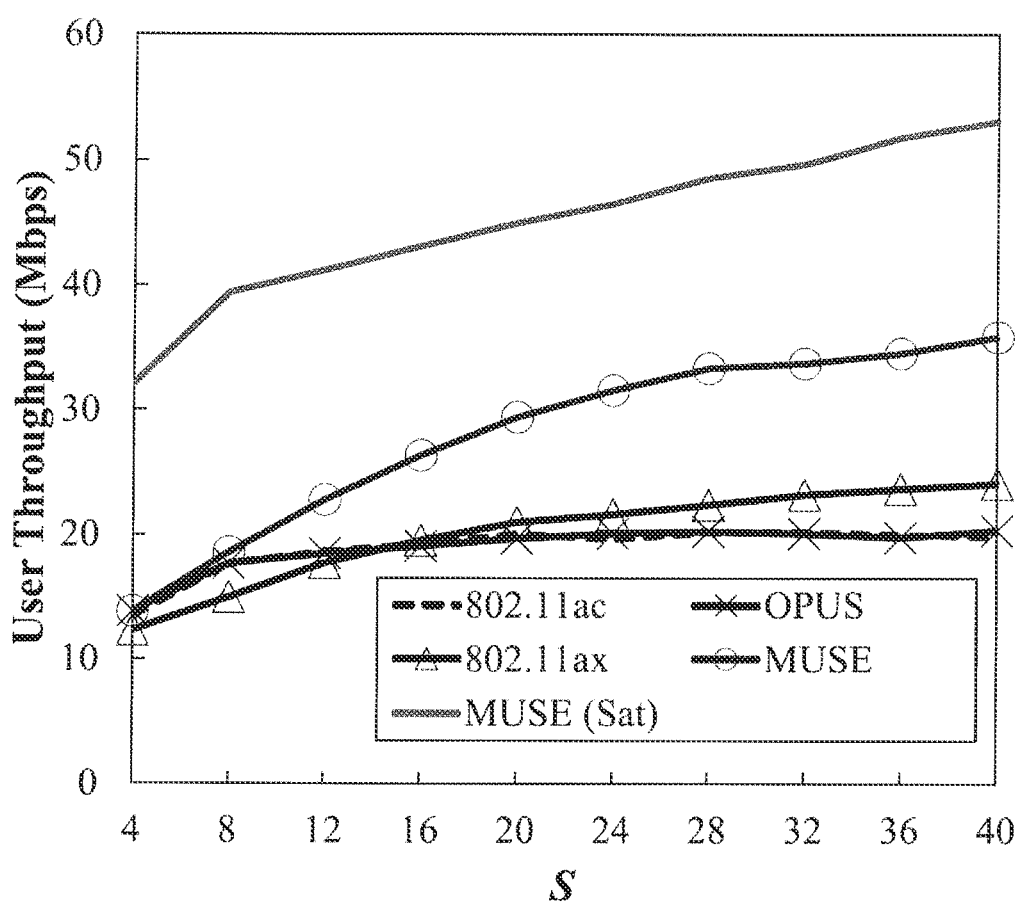
Figure 9C:
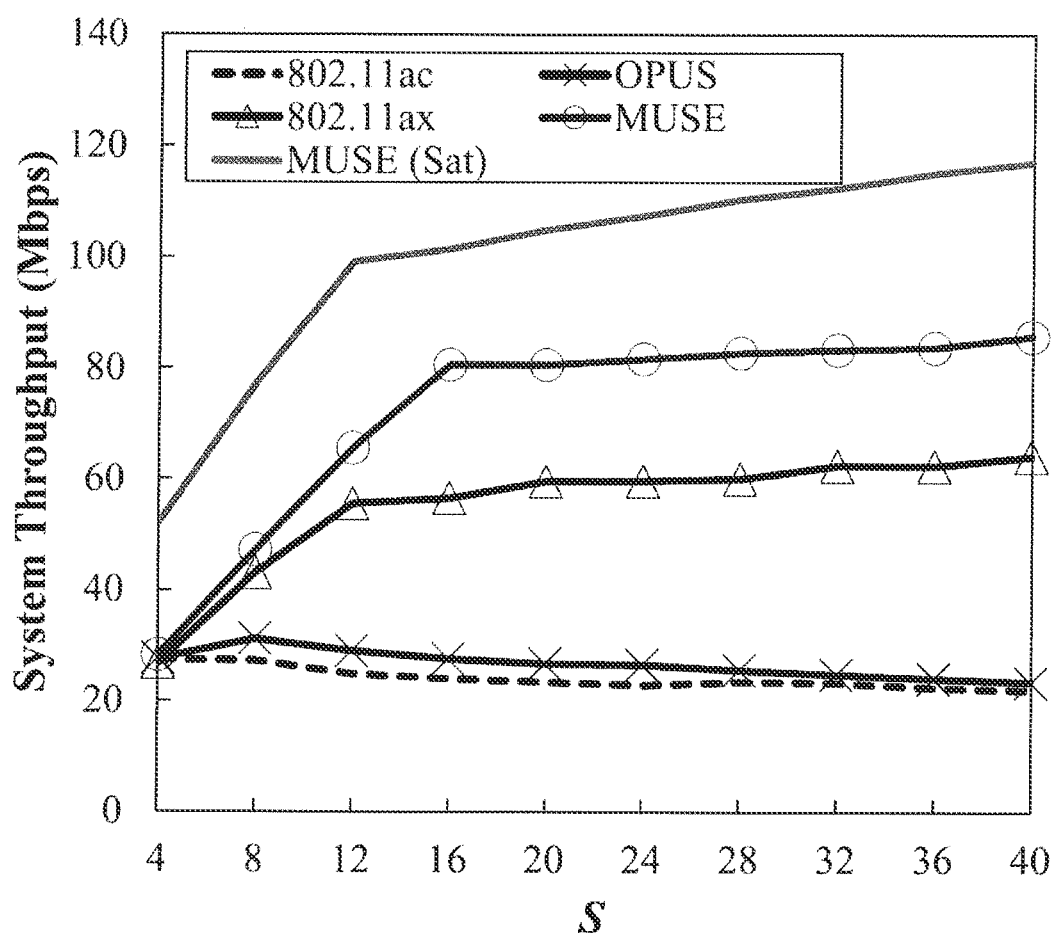

To carry out an overall performance evaluation, the throughput of MUSE is compared to those of other schemes as the number of users (i.e., S) varies. In this regard, FIG. 9A to 9C show Throughput vs. S. MUSE obtains maximum improvements of 3:9×, 3:7× and 1:4× in system throughput compared to 802.11ac, OPUS and 802.11ax, respectively. For the purposes of comparison, the results of saturation throughput of MUSE are also shown (denoted as 'MUSE (Sat)'.) FIG. 9A refers AP Throughput, FIG. 9B refers User Throughput, and FIG. 9C refers System Throughput.

More specifically, FIG. 9 shows the results, and for the purposes of comparison, the saturation throughput results of MUSE are also illustrated. Firstly, we can see that for both the AP and users, 802.11ac has the worst performance. As S increases, the throughput of the AP decreases, since channel contention becomes severe. For user throughput, it soon becomes saturated, meaning that the individual throughput of users decreases as S increases. The overall performance of OPUS is similar to that of 802.11ac, except that the AP can obtain more throughput due to the MU-MIMO user selection scheme. However, we also see that unless the AP is provided with sufficient transmission opportunities, the advantages of user selection affect the system throughput very little.

We can see that 802.11ax outperforms both 802.11ac and OPUS. This gain mainly arises from the low level of channel contention due to the uplink OFDMA of 802.11ax. In this evaluation, frame collisions between nodes do not take place, since all users need to access the channel via the AP signal (i.e., via the TF), and not individually. As a result, this access mechanism provides high MAC efficiency, especially in dense network scenarios. However, we also can see that for a small number of users, 802.11ax has a rather lower throughput than 802.11ac and OPUS. This is due to the value of $\lambda_{tf}$. These results indicate that when the number of users is relatively small, and thus channel contention is not severe, it may be advantageous for users to access the channel individually via DCF. In 802.11ax-based networks, in order to optimize the system performance, it is therefore necessary to use appropriate $\lambda_{tf}$ in consideration of the traffic needs of users. MUSE delivers much more throughput to both the AP and the users than any other scheme, by taking advantage of MU-MIMO user selection and uplink OFDMA. When S is 40, which is the most dense network scenario in the evaluation, the system throughput of MUSE increases to 3.9×, 3.7× and 1.4× that of 802.11ac, OPUS and 802.11ax, respectively. For a small number of users, MUSE provides better performance than 802.11ax, since users of MUSE have more transmission opportunities than in 802.11ax due to the integrated uplink and downlink transmission.

Gain of Mu-Mimo User Selection

This subsection analyzes the throughput gain in MUSE due to MU-MIMO user selection. The average spectral efficiency of the downlink MU-MIMO transmissions for three schemes, 802.11ac, OPUS, and MUSE, are compared based on the different numbers of AP antennas (i.e., M). To compute the spectral efficiency, the following formula for the Shannon capacity is used:

$$\sum_{s \in S_M} \log_2(1 + SNR_s), \quad (19)$$

where $SNR_s$ and $S_M$ denote the received SNR of user s and the MU-MIMO group, respectively. Note that the spectral efficiency used here is a theoretical maximum data rate, rather than the actual data rate. In particular, the MAC overhead is not considered in this formula, and thus the computed value may seem somewhat larger than the results in the previous set of evaluations.

Figure 10:
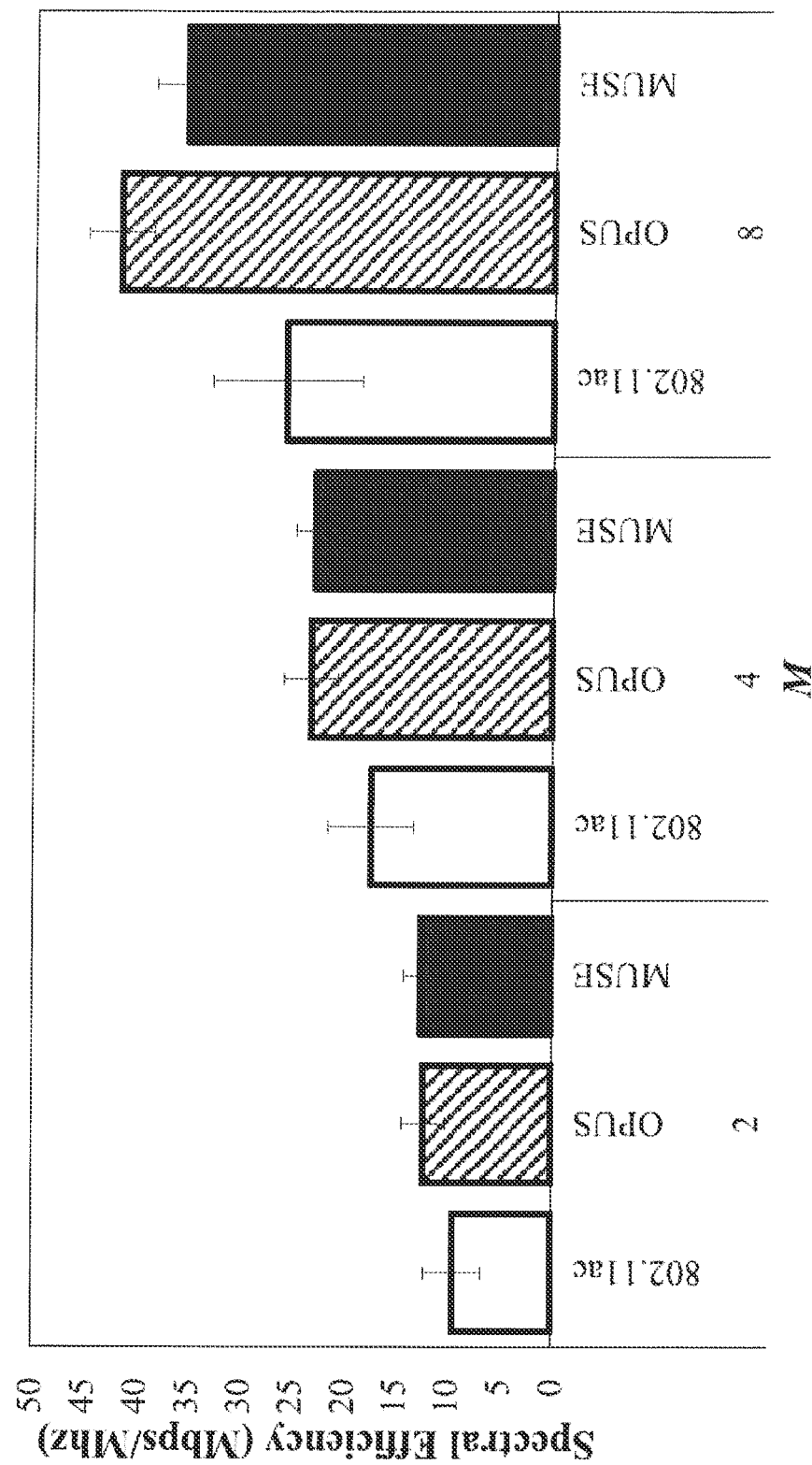
FIG. 10 shows MU-MIMO performance vs. M.

FIG. 10 shows MU-MIMO performance vs. M. The performance of MU-MIMO is improved as M increases, and OPUS and MUSE achieve higher spectral efficiency than 802.11ac due to user selection. More specifically, FIG. 10 shows the results. For all schemes, the MU-MIMO performance is improved as M increases, as expected, and in particular OPUS and MUSE achieve higher spectral efficiency than 802.11ac due to the effects of user selection. This gain becomes larger as M increases, and when M is 8, OPUS and MUSE have maximum performance gains of 62% and 38%, respectively.

Although MUSE provides a higher MU-MIMO diversity gain, its gain is lower than that of OPUS. As expected, this is due to the different diversity levels that each scheme can exploit. In OPUS, all users can be candidates for a MU-MIMO group, meaning that in this evaluation, all 40 users can be candidates. However, in MUSE, only $g^{max}$ users can be candidates, which is less than those of OPUS. Since the sum-capacity of MU-MIMO grows logarithmically with the number of candidates, as shown in Eq. (14), OPUS is likely to achieve a higher gain than MUSE in terms of the sum-capacity. This gap also becomes bigger when the number of AP antennas increases. As shown in Eq. (14), the number of AP antennas has a greater impact on the sum-capacity than the number of candidates, and the performance gap between the two is therefore significant when M=8 as compared to the other cases. Note, however, that the MAC overhead for user selection in MUSE is much lower than for OPUS, meaning that MUSE can achieve higher throughput than OPUS, as shown in the previous set of results.

Effect of Scheduling Policy

Figure 11A:
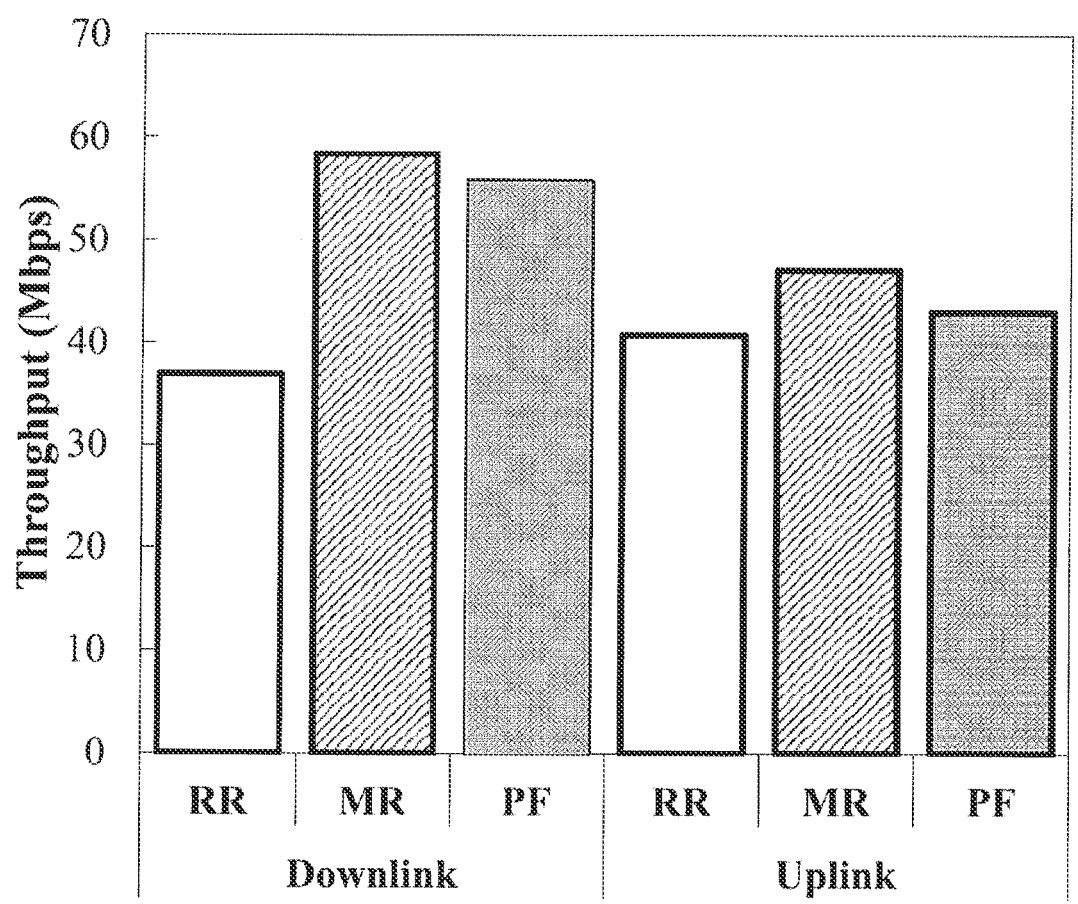
FIGS. 11A and 11B show Impact of scheduling policy on downlink and uplink throughputs.

This subsection examines the effect of scheduling policy on the uplink and downlink throughput performances. In order to obtain clearer results, a heterogeneous bandwidth user scenario is considered. $B^{max}$ is set to 160, and the numbers of users with maximum bandwidths of 20, 40, 80, and 160 MHz are set to 16, 12, 8, and 4, respectively. FIG. 11A shows Impact of scheduling policy on downlink and uplink throughputs. In this simulation, the numbers of users with maximum bandwidths of 20, 40, 80, and 160 MHz are 16, 12, 8, and 4, respectively.

Figure 11B:
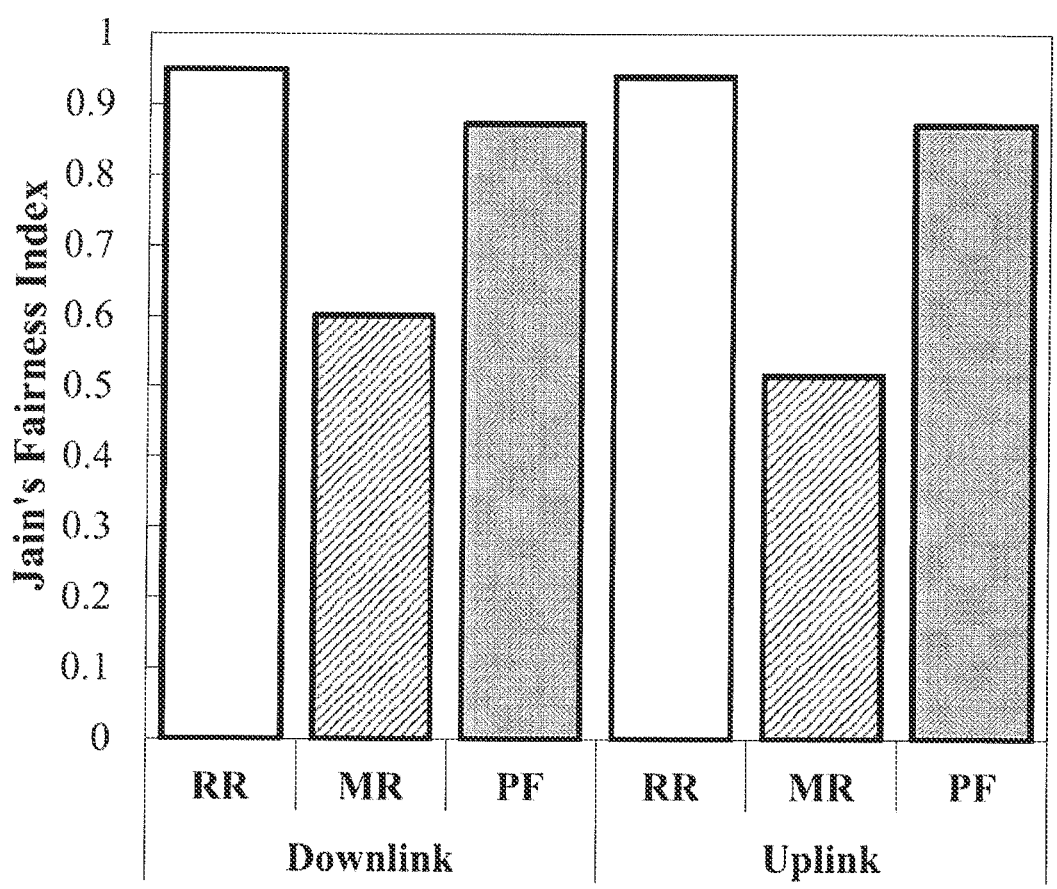

More specifically, FIG. 11B shows the downlink and uplink throughputs for three different scheduling policies and their fairness indices. Overall, for downlink and uplink cases, we can see that the fairness performances are very similar, which is because the same scheduling policy is applied to both uplink and downlink transmissions in MUSE resource allocation, as shown in Eq. (10) and (11).

When PF is applied, the fairness is better than for MR, but both downlink and uplink throughputs are slightly degraded. MUSE can achieve the highest throughputs on both of them with the MR policy, but the fairness index drops sharply to around 0.5. RR gives the best fairness result at the expense of the lowest throughput.

Performance in Co-Existence with Legacy Users

Although the previous simulation results show that MUSE can provide much higher throughput than other schemes, the issue then arises of whether MUSE works well in co-existence with legacy nodes, and whether the schemes employed in MUSE degrade the performance of legacy nodes. Recall that so far, simulations have been conducted under the assumption that all nodes are equipped with uplink OFDMA functionality. In this simulation, half of the users may be configured as 802.11ac nodes (denoted as Legacy in the results) which have only MU-MIMO capability, and which have neither OFDMA nor MU-MIMO user selection functionalities.

FIG. 12A to FIG. 12D show Performance evaluation in co-existence with legacy users. In this evaluation, users are divided into two groups, one of which is set to legacy users (802.11ac). Note that for 802.11ac, the two groups are actually the same legacy users, although they are separated in the results.

Figure 12A:
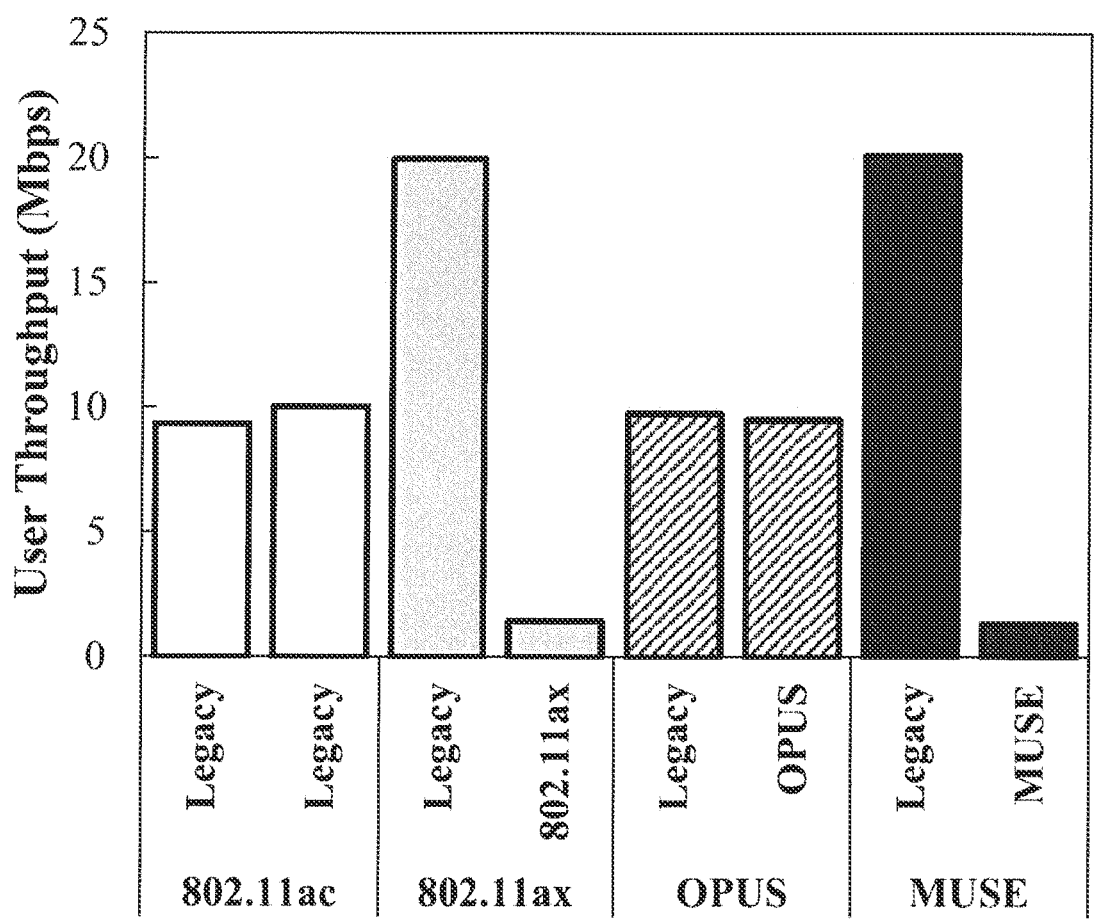
FIG. 12A to 12D show Performance evaluation in co-existence with legacy users.
Figure 12B:
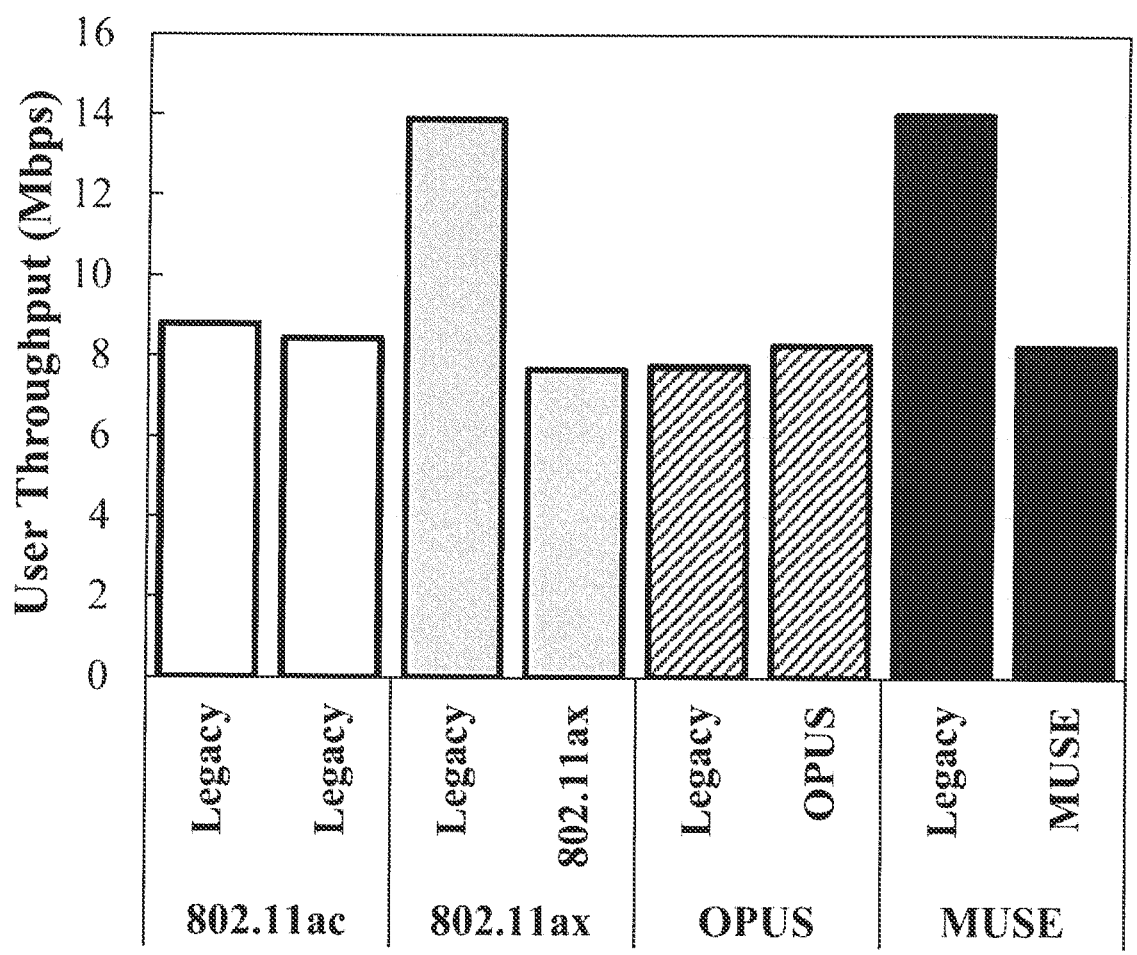
Figure 12C:
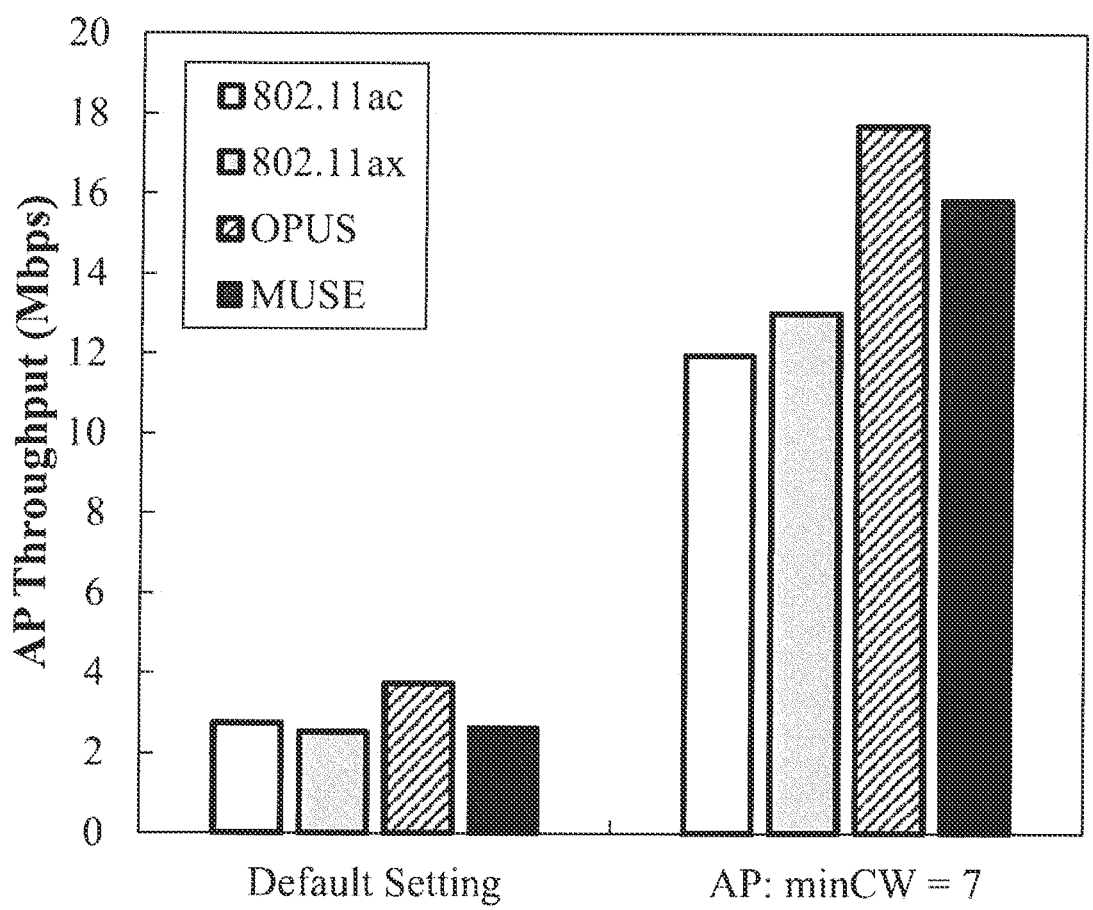
Figure 12D:
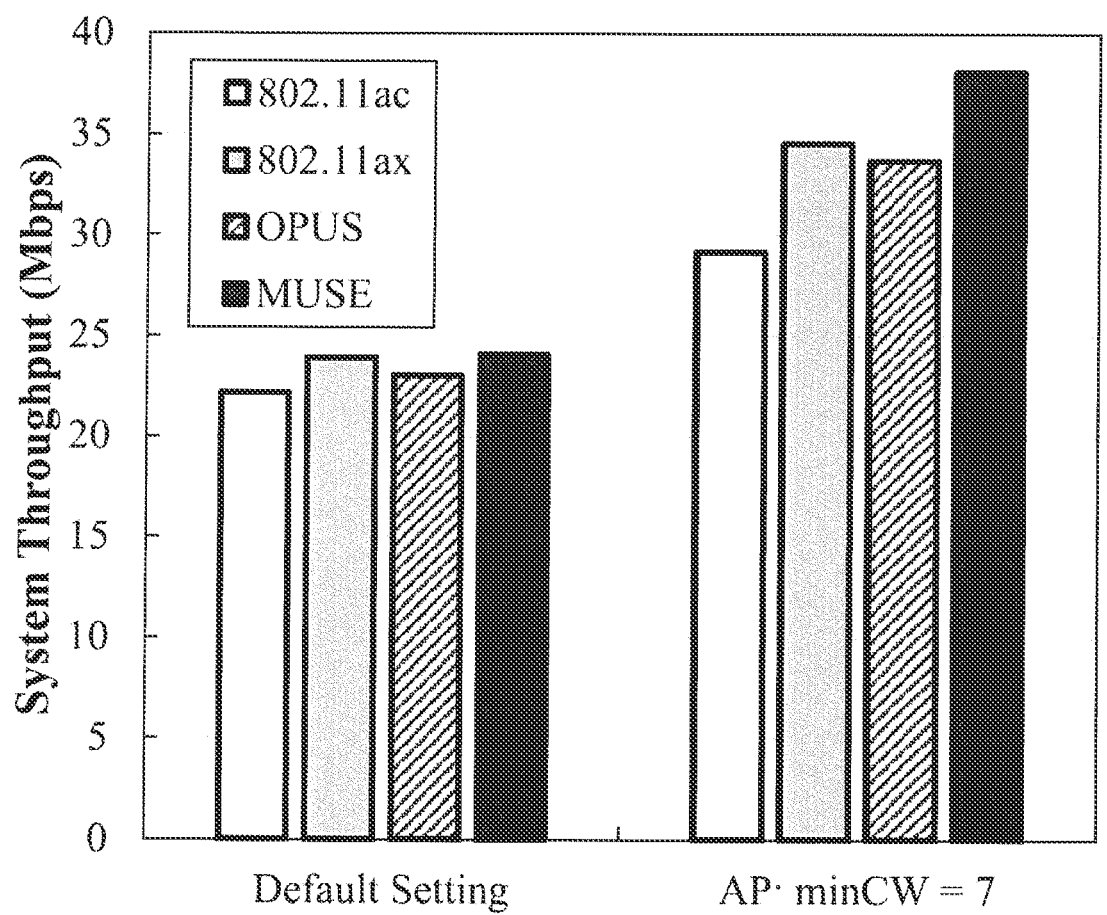

We first examine the user throughput results in FIG. 12A. From the graph, we can see that compared to 802.11ac and OPUS, 802.11ax and MUSE both suffer from a high throughput imbalance between user types: legacy users obtain most of the user throughput, while the others have little, even though they are equipped with the new processes. The main reason for this result stems from the fact that the AP finds it difficult to obtain the transmission opportunities due to heavy channel contention, and thus OFDMA-capable users also may not have sufficient transmission opportunities. FIG. 12C supports this result: the throughput of the 802.11ax AP and the MUSE AP at the default setting are lower than those in 802.11ac and OPUS. This result has the important implication that when OFDMA is adopted in Wi-Fi systems, the AP should be guaranteed sufficient transmission opportunities, so that OFDMA users also can send their data in a stable manner. One effective way to achieve this is to adopt different transmission priorities for users, and the existing EDCA mechanisms may be suitable in this case. FIG. 12B shows the user throughput result when a higher transmission priority is given to the AP by changing the minimum contention window (i.e., min CW) from 31 to 7. The throughput of MUSE and 802.11ax users increases to the level of legacy users in 802.11ac, showing that both can work well with legacy users. In fact, legacy users in these two schemes obtain much higher throughput than in 802.11ac, and thus the system throughput is significantly increased (FIG. 12D), due to the low degree of channel congestion.

This specification proposes MUSE, a new MU-MIMO user selection scheme for 802.11ax networks. By exploiting uplink OFMDA for MU-MIMO user selection, MUSE achieves significant throughput gain over conventional schemes. MATLAB simulation results show that MUSE obtains system throughput that is 3.9×, 3.7×, 1.4× higher than 802.11ac, OPUS, and 802.11ax, respectively, and also operates successfully in co-existence with legacy nodes. In addition, this specification indicates that the adoption of existing EDCA could be an effective way to resolve the possible throughput imbalance problem in 802.11ax-based heterogeneous networks.

Figure 16:
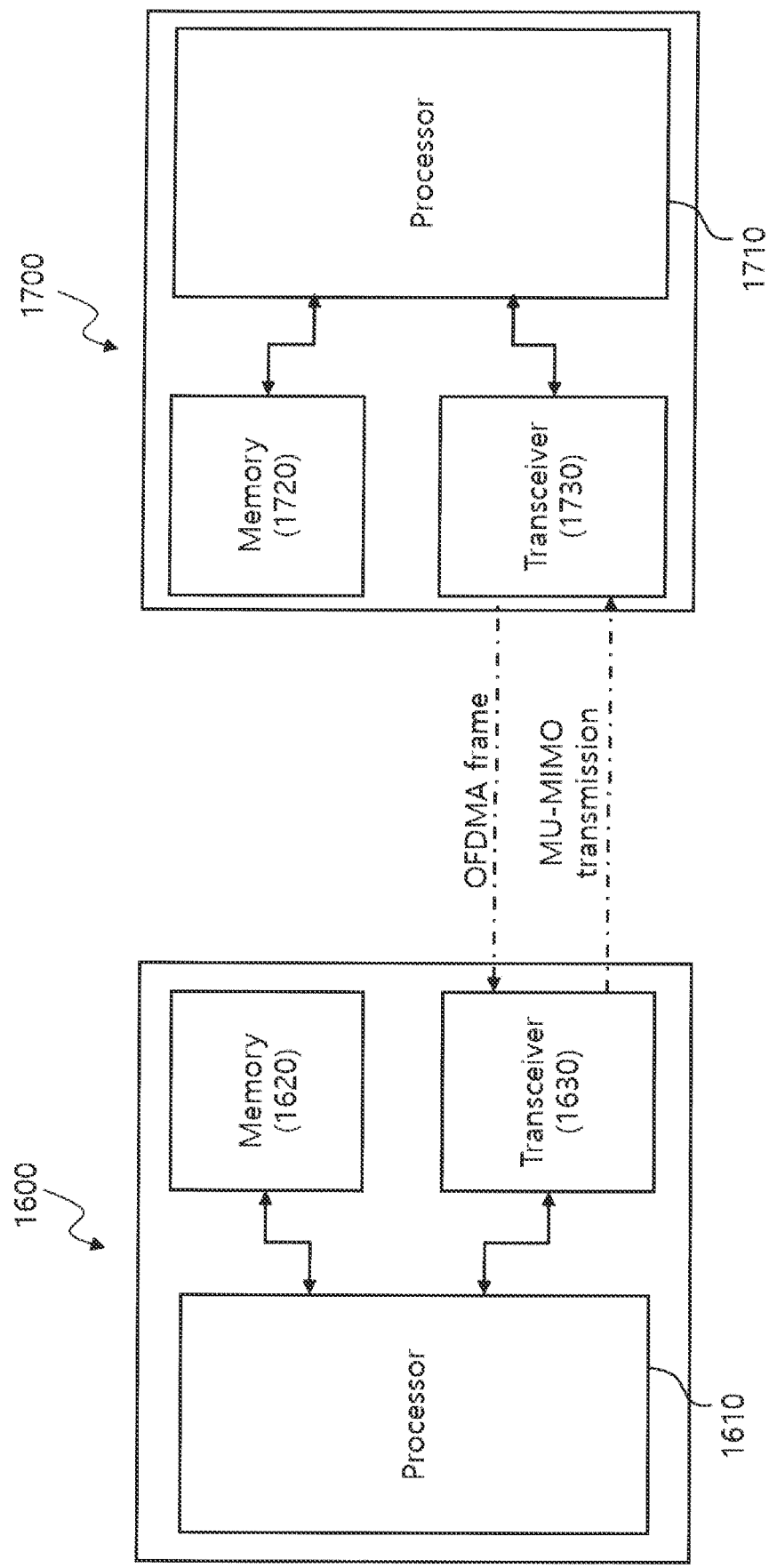
FIG. 16 shows an AP and a station, according to one embodiment of the present disclosure.

FIG. 16 refers an AP and a station, according to embodiments of the present disclosure. Referring to FIG. 16, a station 1700 includes a processor 1710, a memory 1720, and a transceiver 1730. A processor 1710 may be configured to realize functions, processes, and/or methods described in this specification. Layers of radio interface protocols may be realized on the processor 1710. The memory 1720 is coupled to the processor 1710 and stores various types of information for driving the processor 1710. The transceiver 1730 is coupled to the processor 1710 and transmits and/or receives a radio signal to/from an Access Point, AP 1600.

An AP 1600 includes a processor 1610, a memory 1620, and a transceiver 1630. A processor 1610 may be configured to realize functions, processes, and/or methods described in this specification. Layers of radio interface protocols may be realized on the processor 1610. The memory 1620 is coupled to the processor 1610 and stores various types of information for driving the processor 1610. The transceiver 1630 is coupled to the processor 1610 and transmits and/or receives a radio signal to/from the station 1700.

The processor 1610, 1710 may include application-specific integrated circuits (ASICs), other chipsets, logic circuits and/or data processing devices. The memory 1620, 1720 may include a read-only memory (ROM), a random access memory (RAM), a flash memory, a memory card, a storage medium and/or other storage devices. The transceiver 1630, 1730 may include a baseband circuit for processing a radio signal. When an embodiment of the present disclosure is implemented as software, the aforementioned scheme may be implemented as a module (process, function, etc.) for performing the aforementioned function. The module may be stored in the memory 1620, 1720 and executed by the processor 1610, 1710. The memory 1620, 1720 may be placed inside or outside the processor 1610, 1710 and connected to the processor 1610, 1710 using a variety of well-known means.

The method according to an embodiment of the present invention can be implemented as computer-readable instructions on a computer-readable recording medium. The computer-readable recording medium comprises all kinds of recording media storing data which can be interpreted by a computer system. For example, the computer-readable recording medium may include a Read Only Memory (ROM), a Random Access Memory (RAM), a magnetic tape, a magnetic disk, a flash memory, an optical data storage device, and the like. In addition, the computer-readable recording medium may be distributed in computer systems connected to a computer network, and may be stored and executed as a code readable in a distribution manner.

While the present invention has been described with reference to the accompanying drawings and exemplary embodiments, it is to be understood that the invention is not limited by the accompanying drawings and embodiments. It will be understood by those skilled in the art that various changes in form and details may be made therein without departing from the spirit and scope of the invention as defined by the appended claims.

In particular, the described features may be implemented within digital electronic circuitry, or computer hardware, firmware, or combinations thereof. The features may be implemented in a computer program product embodied in a storage device in a machine-readable storage device, for example, for execution by a programmable processor. Also, the features may be performed by a programmable processor executing a program of instructions for performing functions of the described embodiments, by operating on input data and generating an output. The described features may be implemented in at least one computer programs that can be executed on a programmable system including at least one programmable processor, at least one input device, and at least one output device which are combined to receive data and directives from a data storage system and to transmit data and directives to the data storage system. A computer program includes a set of directives that can be used directly or indirectly within a computer to perform a particular operation on a certain result. A computer program may be written in any form of programming language including compiled or interpreted languages, and may be used in any form included as modules, elements, subroutines, or other units suitable for use in other computer environments or independently operable programs.

Suitable processors for execution of the program of directives include, for example, both general-purpose and special-purpose microprocessors, and a single processor or one of multiple processors of other type of computer. In addition, storage devices suitable for implementing the computer program directives and data implementing the described features include, for example, semiconductor memory devices such as EPROM, EEPROM, and flash memory devices, magnetic devices such as internal hard disks and removable disks, magneto-optical disks, and all forms of nonvolatile memories including CD-ROM and DVD-ROM disks. The processor and memory may be integrated within Application-Specific Integrated Circuits (ASICs) or added by ASICs.

While the present invention has been described on the basis of a series of functional blocks, it is not limited by the embodiments described above and the accompanying drawings, and it will be apparent to those skilled in the art that various substitutions, modifications and variations can be made without departing from the scope of the present invention.

The combination of the above-described embodiments is not limited to the above-described embodiments, and various forms of combination in addition to the above-described embodiments may be provided according to implementation and/or necessity.

In the above-described embodiments, the methods are described on the basis of a flowchart as a series of operations or blocks, but the present invention is not limited to the order of the operations, and some operations may occur in different orders or at the same time unlike those described above. It will also be understood by those skilled in the art that the operations shown in the flowchart are not exclusive, and other operations may be included, or one or more operations in the flowchart may be omitted without affecting the scope of the present invention.

The above-described embodiments include examples of various aspects. While it is not possible to describe every possible combination for expressing various aspects, one of ordinary skill in the art will recognize that other combinations are possible. Accordingly, it is intended that the present invention include all alternatives, modifications and variations that fall within the scope of the following claims.

What is claimed is:

1. A method for Multi-User Multi-Input Multi-Output (MU-MIMO) transmission, the method comprising:
   receiving, by an access point (AP), an uplink Orthogonal Frequency Division Multiple Access (OFDMA) frame from a plurality of stations;
   estimating, by the AP, downlink channel states for the plurality of stations based on the uplink OFDMA frame; and
   selecting, by the AP, one or more of the plurality of stations for downlink MU-MIMO transmissions based on the estimation of downlink channel states for the plurality of stations,
   wherein said uplink OFDMA frame comprises at least one channel estimation slot, the channel estimation slot being configured to allocate wider channel bandwidth to at least one of the plurality of stations than a channel bandwidth by OFDMA resource allocation.

2. The method of claim 1, wherein said at least one channel estimation slot is located at the end of the uplink OFDMA frame.

3. The method of claim 2, wherein said uplink OFDMA frame is configured to allocate resources to the plurality of stations based on a performance of both the uplink OFDMA transmission and the downlink MU-MIMO transmission.

4. The method of claim 3, wherein
   said performance of the uplink OFDMA transmission comprises obtaining data transmission time for the uplink OFDMA transmission, and
   said performance of the downlink MU-MIMO transmission comprises obtaining a downlink MU-MIMO diversity gain.

5. The method of claim 3, wherein said allocating resources comprises regulating the number of the channel estimation slot in the OFDMA frame.

6. The method of claim 1, further comprising
   performing downlink MU-MIMO transmission for the selected one or more of the plurality of stations,
   wherein both said receiving the uplink OFDMA frame and said performing downlink MU-MIMO transmission are configured to occur within one transmission opportunity (TxOP).

7. The method of claim 1, wherein said receiving the uplink OFDMA frame from the plurality of stations comprises receiving an uplink OFDMA frame from one or more of stations which have no data to be sent.

8. A method for Multi-User Multi-Input Multi-Output (MU-MIMO) transmission, the method comprising:
   receiving, by a station, a trigger frame (TF) from an access point (AP); and
   in response to receiving the TF, sending, by the station, uplink Orthogonal Frequency Division Multiple Access (OFDMA) frame to the AP,
   wherein the uplink OFDMA frame is to be used to estimate downlink channel states for a downlink MU-MIMO transmission,
   wherein said uplink OFDMA frame comprises at least one channel estimation slot, the channel estimation slot being configured to allocate wider channel bandwidth to at least one of a plurality of stations than a channel bandwidth by OFDMA resource allocation.

9. An apparatus for Multi-User Multi-Input Multi-Output (MU-MIMO) transmission, the apparatus comprising a processor and a transceiver, the processor being configured to:
   receive, by an access point (AP), an uplink Orthogonal Frequency Division Multiple Access (OFDMA) frame from a plurality of stations;
   estimate, by the AP, downlink channel states for the plurality of stations based on the uplink OFDMA frame; and
   select, by the AP, one or more of the plurality of stations for downlink MU-MIMO transmissions based on the estimation of downlink channel states for the plurality of stations,
   wherein said uplink OFDMA frame comprises at least one channel estimation slot, the channel estimation slot being configured to allocate wider channel bandwidth to at least one of the plurality of stations than a channel bandwidth by OFDMA resource allocation.

10. The apparatus of claim 9, wherein said at least one channel estimation slot is located at the end of the uplink OFDMA frame.

11. The apparatus of claim 10, wherein said uplink OFDMA frame is configured to allocate resources to the plurality of stations based on a performance of both the uplink OFDMA transmission and the downlink MU-MIMO transmission.

12. The apparatus of claim 11, wherein
said performance of the uplink OFDMA transmission comprises obtaining data transmission time for the uplink OFDMA transmission, and
said performance of the downlink MU-MIMO transmission comprises obtaining a downlink MU-MIMO diversity gain.

13. The apparatus of claim 11, wherein said allocating resources comprises regulating the number of the channel estimation slot in the OFDMA frame.

14. The apparatus of claim 9, the processor being further configured to perform downlink MU-MIMO transmission for the selected one or more of the plurality of stations,
wherein both said receiving the uplink OFDMA frame and said performing downlink MU-MIMO transmission are configured to occur within one transmission opportunity (TxOP).

15. The apparatus of claim 9, wherein said receiving the uplink OFDMA frame from the plurality of stations comprises receiving an uplink OFDMA frame from one or more of stations which have no data to be sent.

16. An apparatus for Multi-User Multi-Input Multi-Output (MU-MIMO) transmission, the apparatus comprising a processor and a transceiver, the processor being configured to:
receive, by a station, a trigger frame (TF) from an access point (AP); and
in response to receiving the TF, send, by the station, uplink Orthogonal Frequency Division Multiple Access (OFDMA) frame to the AP,
wherein the uplink OFDMA frame is to be used to estimate downlink channel states for a downlink MU-MIMO transmission,
wherein said uplink OFDMA frame comprises at least one channel estimation slot, the channel estimation slot being configured to allocate wider channel bandwidth to at least one of a plurality of stations than a channel bandwidth by OFDMA resource allocation.

17. The method of claim 1, wherein the AP is configured to select the one or more of the plurality of stations based on an optimal user selection method.

18. The method of claim 8, wherein the station is selected among the plurality of stations based on an optimal user selection method.

19. The apparatus of claim 9, wherein the AP is configured to select the one or more of the plurality of stations based on an optimal user selection method.

20. The apparatus of claim 16, wherein the station is selected among the plurality of stations based on an optimal user selection method.

* * * * *